United States Patent [19]

Madrid et al.

[11] Patent Number: 5,311,577
[45] Date of Patent: May 10, 1994

[54] DATA PROCESSING SYSTEM, METHOD AND PROGRAM FOR CONSTRUCTING HOST ACCESS TABLES FOR INTEGRATION OF TELEPHONY DATA WITH DATA PROCESSING SYSTEMS

[75] Inventors: Richard J. Madrid, Gaithersburg; Steven K. Miller, Germantown; Suresh K. Gursahaney, Gaithersburg, all of Md.

[73] Assignee: International Business Machines Corporation, Armonk, N.Y.

[21] Appl. No.: 847,453

[22] Filed: Mar. 6, 1992

[51] Int. Cl.⁵ ................... H06M 11/00; H06M 3/42; H06M 3/00
[52] U.S. Cl. ........................................ 379/93; 379/96; 379/201; 379/267
[58] Field of Search ............... 379/93, 94, 96, 97, 379/99, 201, 207, 266, 267

[56] References Cited
U.S. PATENT DOCUMENTS

| | | | |
|---|---|---|---|
| 3,989,899 | 11/1976 | Norwich | 179/2 DP |
| 4,320,256 | 3/1982 | Freeman | 179/606 |
| 4,406,925 | 9/1983 | Jordan et al. | 179/18 |
| 4,438,296 | 3/1984 | Smith | 179/602 |
| 4,451,700 | 5/1984 | Kempner et al. | 179/2 AS |
| 4,599,493 | 7/1986 | Cave | 179/18 |
| 4,782,517 | 11/1988 | Bernardis et al. | 379/201 |
| 4,797,911 | 1/1989 | Szlam et al. | 379/67 |
| 4,894,857 | 1/1990 | Szlam et al. | 379/67 |
| 4,949,373 | 8/1990 | Baker, Jr. et al. | 379/96 |
| 5,036,535 | 7/1991 | Gechter et al. | 379/210 |
| 5,097,528 | 3/1992 | Gorsahaney et al. | 379/67 |

Primary Examiner—Curtis Kuntz
Assistant Examiner—I. Rana
Attorney, Agent, or Firm—John E. Hoel

[57] ABSTRACT

The Host Access Table (HAT) Development Facility invention provides an intelligent editor for constructing HAT command tables, using online interaction with the host to automatically insert format information from the host display panels into HAT commands being created by the writer. The resulting HAT commands direct the interaction of a teleservicing workstation with a host computer in a terminal emulation mode, to perform interactive operations with a telephone PBX and related data processing servers. The HAT Development Facility runs in a multi-tasked session with a terminal emulation program in the workstation, allowing the writer to directly interact with the terminal emulation program while creating the HAT commands using the HAT Development Facility. An optional real time test mode is also provided.

16 Claims, 21 Drawing Sheets

RECORD MODE

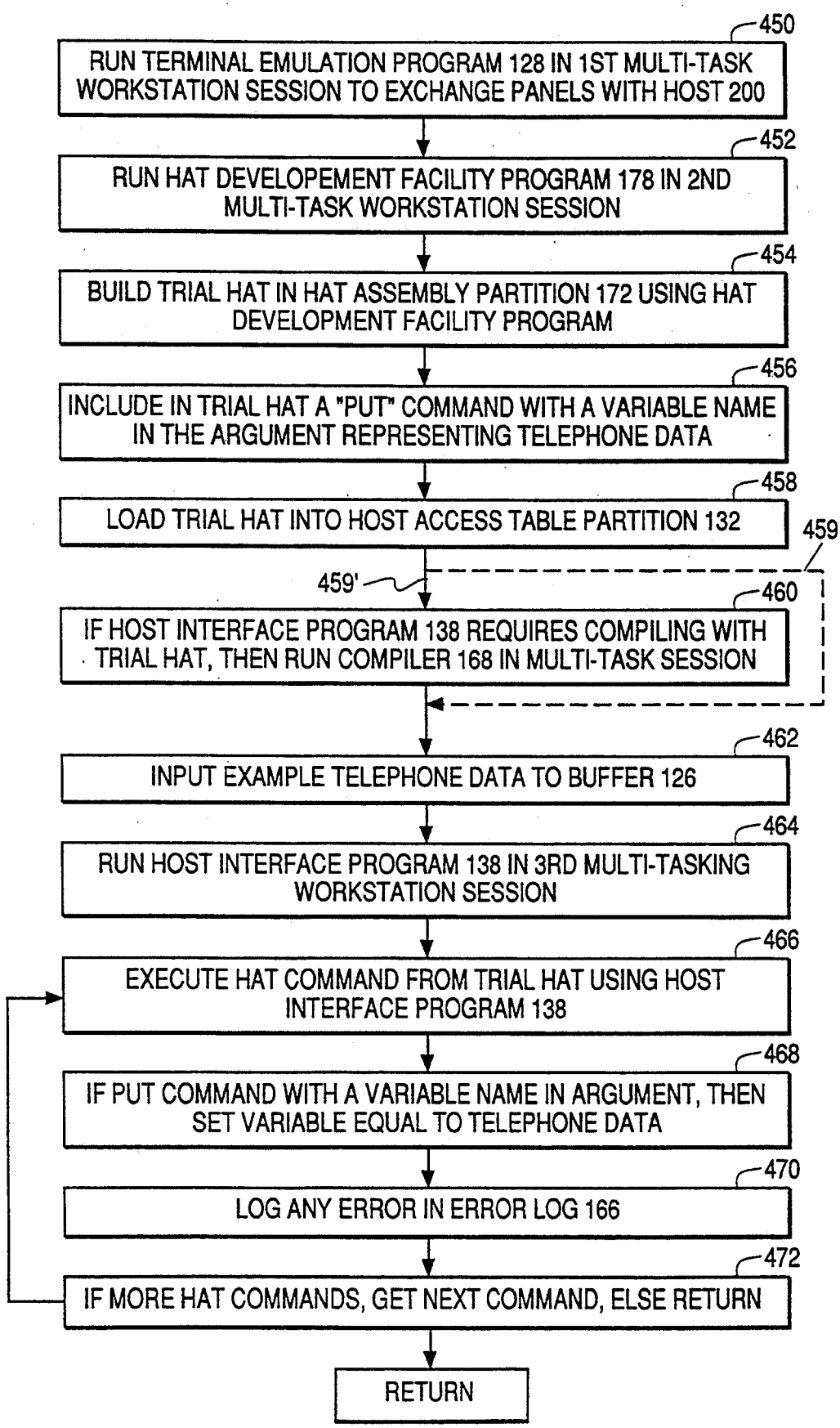

DATA PROCESSING SYSTEM, METHOD AND PROGRAM FOR CONSTRUCTING HOST ACCESS TABLES FOR INTEGRATION OF TELEPHONY DATA WITH DATA PROCESSING SYSTEMS

BACKGROUND OF THE INVENTION

1. Technical Field

The invention disclosed broadly relates to data processing systems and more particularly relates to the integration of telephony information in a data processing system.

2. Background Art

Today's competitive business environment has increased the importance of customer service. In many industries, the best company is determined by the service it provides its customers. In many cases, the primary interface the customer has with the company is the telephone. Depending on the business, the customer's calls are serviced by some type of call center. The call center could be a help desk, customer service, telephone sales or claims. A call center can perform both outbound calling and inbound calling operations.

Recent advances in telephony technology have created an opportunity for improvements in call center operations. Until now, call center employees would answer the telephone and, based on information provided by the caller, access an application on a host computer. With these telephony advances, information about an incoming call is now provided by the Central Office to the company's private branch exchanges (PBX). This information about an incoming call can be used to automatically access host applications to obtain a customer profile.

The co-pending U. S. patent application Ser. No. 07/660,763, filed Feb. 25, 1991 by S.K. Gursahaney, et al. entitled "System for Integrating Telephony Data With Data Processing Systems," is assigned to IBM Corporation and incorporated herein by reference. The Gursahaney, et al. application describes a subsystem for providing a programmable interface between a host-based application program and a telephone network, to automatically transfer operands derived from caller identification data from the telephone network, to the host application program. The system provides an easy technique for a call center to customize its call center functions, without requiring the reprogramming of the host computer. This is accomplished by the use of a host access table (HAT) which contains operational commands to perform interfacing functions between the host application program and the telephone network. When the system is executing the commands in the HAT command table to perform call center functions, the system is referred to herein as operating in the operational mode.

What is needed is a method for easily constructing the HAT command table, by a system administrator of a call center, who is not highly skilled in the programming arts.

OBJECTS OF THE INVENTION

It is therefore an object of the invention to provide a flexible and easy technique for writing command sequences for a data processor to customize call center functions.

It is another object of the invention to provide a technique for writing command sequences for a data processor to customize call center functions, which can be constructed by persons having limited skill in the computer arts.

SUMMARY OF THE INVENTION

A Host Access Table (HAT) is a table of high level language commands which direct the interaction of a teleservicing workstation with a host computer in a terminal emulation mode, to perform interactive operations with a telephone PBX and related data processing servers.

Previously, effective HAT command tables had to be written by a writer having a familiarity with the HAT command syntax, the display panel formats and operations of the host computer, and the signaling conventions of the PBX.

The HAT Development Facility invention provides an intelligent editor for constructing HAT command tables, using online interaction with the host to automatically insert format information from the host display panels into HAT commands being created by the writer.

The HAT Development Facility invention automatically imposes the required syntax onto the HAT commands being created by the writer.

The HAT Development Facility invention provides a record mode, to record the sequence of keystrokes of the writer and to automatically identify when combinations of those keystroke sequences require multiple HAT commands to execute the intended function to be performed.

The record mode of the HAT Development Facility invention allows the writer to work with the online host display panel and to tab through the fields on the panel. The writer can enter character strings at the keyboard and each time a cursor positioning or host action key is pressed, one or more HAT commands are automatically created and written into the HAT command table with the character strings having the required syntax.

The HAT Development Facility invention displays command dialog boxes enabling the writer to select specific format and control features for individual HAT commands being created. The dialog box provides the option of allowing the writer to point to intended fields with a mouse device, to obtain field location coordinates or character strings which are automatically placed into the HAT command being created.

In a first embodiment of the invention, the HAT Development Facility runs in a first multi-tasked session with a terminal emulation program in the workstation, allowing the writer to directly interact with the terminal emulation program while creating the HAT commands using the HAT Development Facility. In the record mode, the writer can press cursor positioning or host action keys and the terminal emulation program will process those keystrokes and exchange sequences of display panels with the host while the HAT Development Facility traps these keystrokes and constructs the corresponding HAT commands for the HAT command table being written.

In a second embodiment of the invention, the HAT Development Facility runs in a multi-tasked mode with two other programs, the host interface program as well as the terminal emulation program. The host interface program can be run as an instruction interpreter, which interprets and executes the HAT commands in a HAT command table during normal workstation teleservicing operations conducted by a telephone agent.

In the second embodiment of the invention, the writer can select a real time test mode where he does not directly interact with the host. Instead, the host interface program receives the newly created HAT commands as they are produced by the intelligent editor function of the HAT Development Facility. The newly created HAT commands are interpreted and executed by the host interface program, resulting in the performance of the intended function for the HAT command. The intended function usually requires forwarding to the terminal emulation program, some of the keystrokes entered at the keyboard. When the host interface program forwards cursor positioning or host action keys, the terminal emulation program will process those keystrokes and exchange sequences of display panels with the host, just as if the workstation were in a normal workstation teleservicing operational mode.

The second embodiment of the HAT Development Facility invention provides the capability for real time testing of the effectiveness of the HAT commands being created by the writer. A HAT command written into the HAT command table being constructed by the writer, contains only the literal representation of variable names, which have no numerical significance to the host. But when the host interface program interprets and executes the HAT command, it substitutes the numerical value represented by the literal representation of the variable name, and this has meaning to the application program running on the host. If a mistake has been made by the writer in the choice of a variable, for example, the resulting value sent by the terminal emulator program to the host will be recognized by the host application program as being erroneous. The next display panel sent back by the host in response, will immediately tell the writer of his mistake.

The resulting HAT Development Facility invention, enables effective HAT command tables to be written by a writer who does not have a familiarity with the HAT command syntax, the display panel formats and operations of the host computer, or the signaling conventions of the PBX.

BRIEF DESCRIPTION OF THE DRAWINGS

The invention disclosed will be more fully understood by referring to the accompanying figures.

FIG. 22 is a flow diagram showing the operation of the terminal emulation program 128, the HAT Development Facility program 178, and the host interface program 138, in a multi-tasking mode in the workstation 100.

DISCUSSION OF THE PREFERRED EMBODIMENT

The invention is a host access table (HAT) development facility (HDF) which enables a system administrator to construct a new HAT command table in an interactive manner, using an actual session between the workstation and the host computer. It can build HAT command tables for both inbound and outbound calling operations.

Programmable Interface System—Gursahaney, et al.

Figure 1:
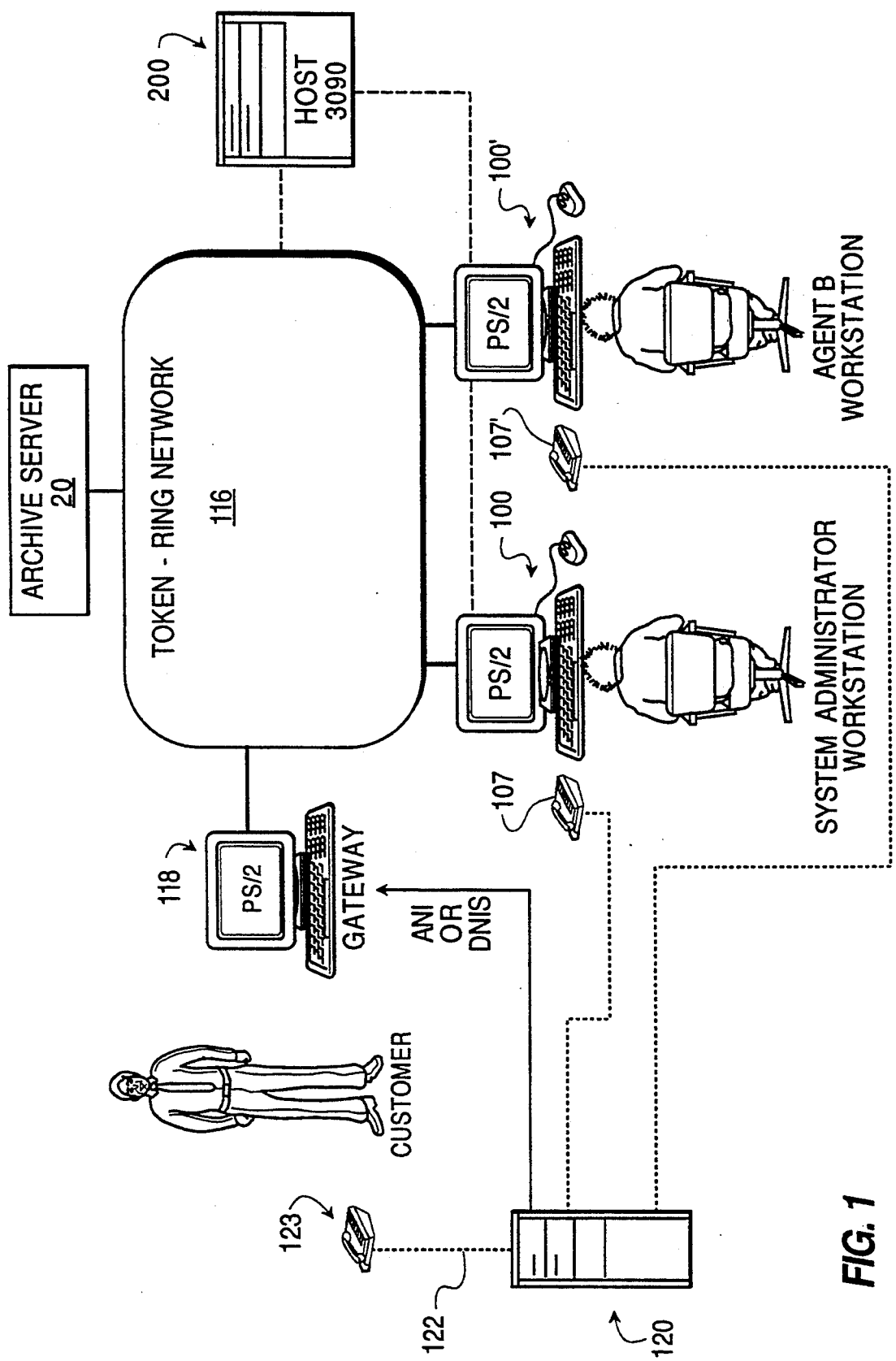
FIG. 1 is a functional block diagram of the programmable interface system when embodied using a token ring network with a plurality of workstations in a customer service application, one of the workstations being used by the system administrator.

As described in the Gursahaney, et al. co-pending patent application, the system shown in FIG. 1 is a programmable interface between a host-based application program and a telephone network, to automatically transfer operands derived from caller identification data from the telephone network, to the host application program.

Since the HAT Development Facility invention is applied in the programmable interface system of FIG. 1, this section will review some of the salient features of the programmable interface system, to set a foundation for a description of the HAT Development Facility invention. Reference should be made to the Gursahaney, et al. co-pending patent application for a more detailed description of the programmable interface system of FIG. 1.

FIG. 1 shows a token ring network 116 which interconnects a workstation 100 used by the system administrator, the workstation 100' used by agent B, a gateway 118 which connects to a telephone PBX 120. The PBX 120 connects over the public switched telephone network 122 to a customer's telephone 123. The PBX 120 is also connected to the telephone 107 at the workstation 100, in reference to FIG. 3, and to the 107' at the workstation 100'. The token ring 116 can also be connected to the host computer 200.

Figure 2:
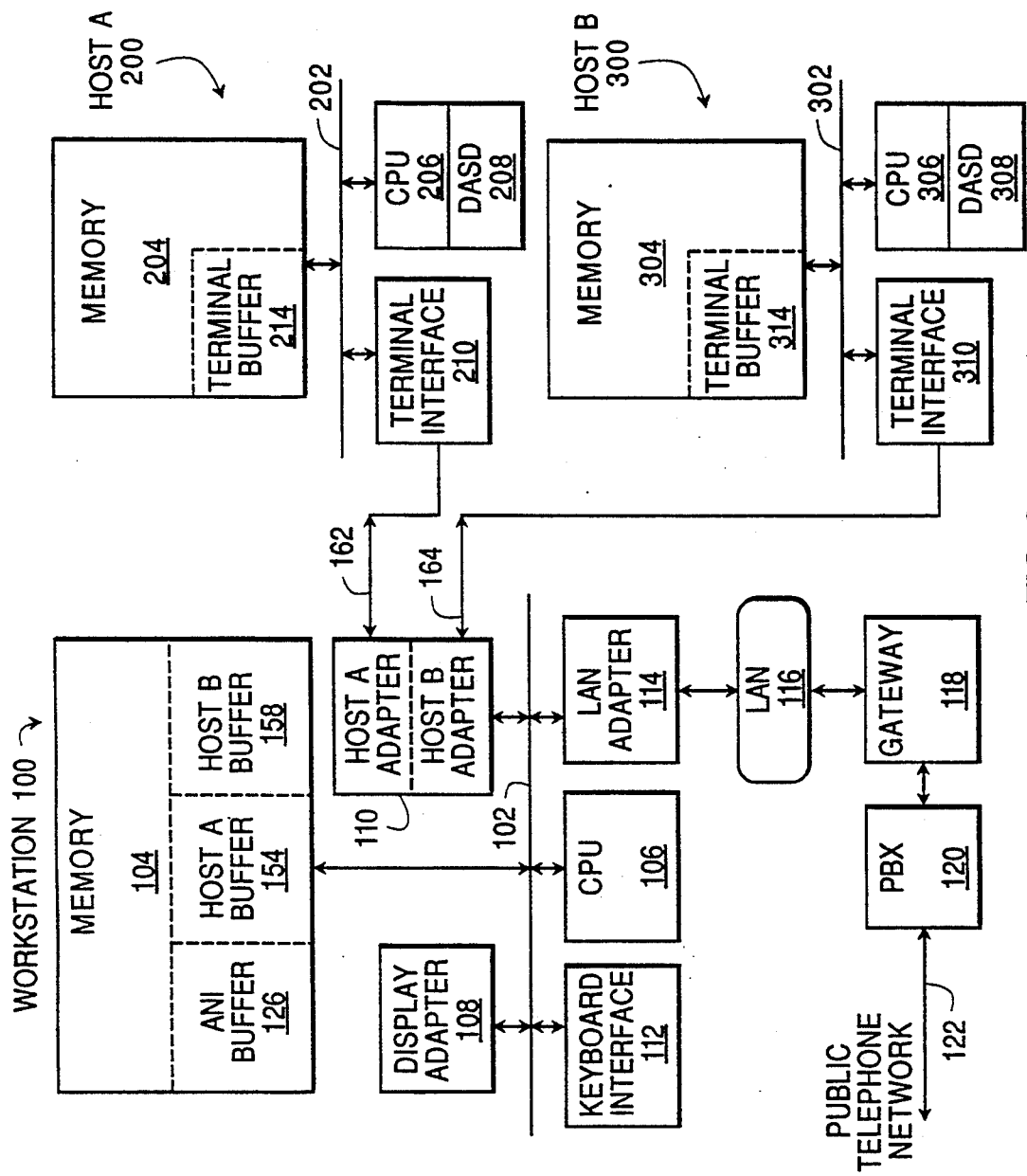
FIG. 2 is a more detailed architectural diagram of the invention.
Figure 5:
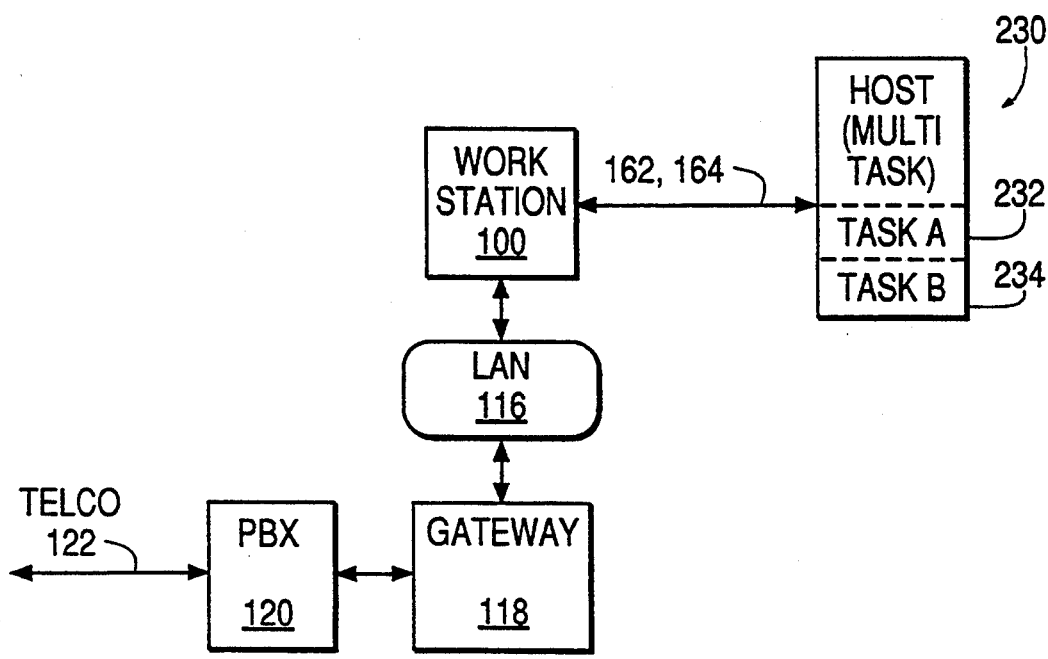
FIG. 5 is an alternate embodiment of the invention showing that the host computer can operate in a multi-tasking mode to perform task A and task B.
Figure 6:
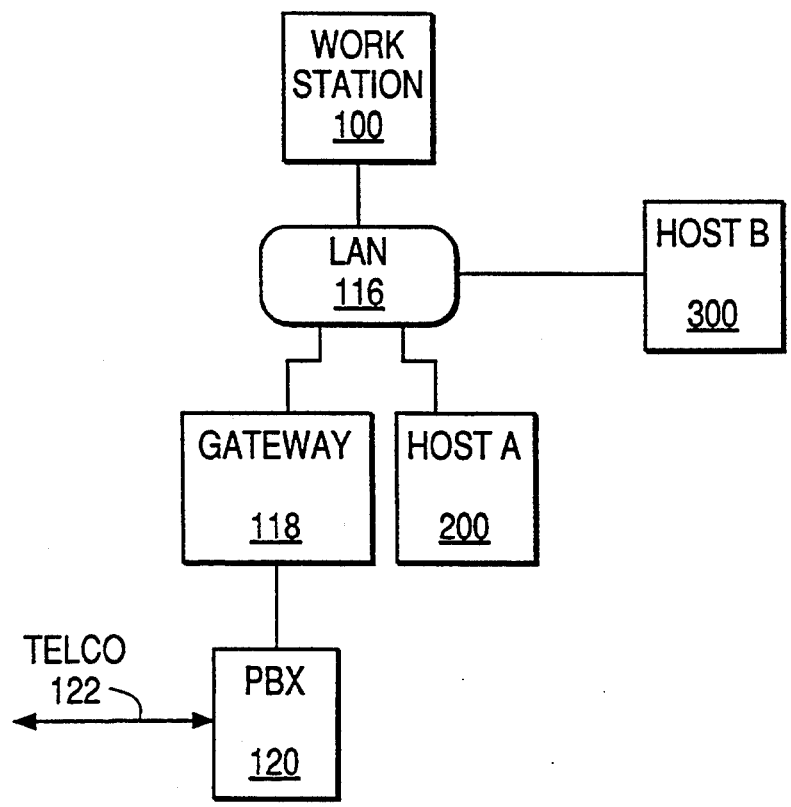
FIG. 6 shows another alternate embodiment of the invention wherein the two host computers and the workstation are connected to a local area network.

Reference to FIG. 2 illustrates a more detailed architectural diagram of the workstation 100 and the host computer 200. Optionally, a second host computer 300 may also be connected to the workstation 100. There are a variety of ways of connecting the workstation 100 to the host computers 200 and 300. In a first configuration shown in FIG. 1, the host 200 is connected over the local area network 116 to the workstation 100. Alternately, the workstation 100 can be directly connected to the host computer 200. FIGS. 5 and 6 show alternate configurations for connecting a host computer to the workstation 100. FIG. 5 shows connecting a host computer 230 directly to workstation 100 by means of the links 162, 164. Host computer 230 can be a multi-task computer with a first task A running in the first partition 232, a second task B running in a second partition 234. FIG. 6 shows a configuration for two host computers, host 200 and host 300, each connected to the local area network 116 to which the workstation 100 is connected. FIG. 2 shows the configuration where the host computer 200 is connected over line 162 to the host adapter 110 of workstation 100 and the second host computer 300 is connected over line 164 to the host adapter 110 of the workstation 100. Each of these configurations is equivalent for the purpose of describing the invention herein.

The workstation 100 of FIG. 2 includes a bus 102 to which is connected the memory 104, CPU 106, display adapter 108, keyboard interface 112, host adapter 110, local network adapter 114. The memory 104 includes partitions for other storage of program instructions and data for various operations to be performed. The ANI buffer 126 is in memory 104, and serves as a buffer to interface automatic number identification (ANI) information or other telephone data received from the public telephone network 122 through the PBX 120, the gateway 118 and the local area network 116. Also included in memory 104 is a host A buffer 154 which buffers a first session conducted between the workstation 100 through the host adapter 110 to the host 200. Also included in the memory 104 is the host B buffer 158 which buffers a second session being conducted between the workstation 100 through the host adapter 110 to the second host 300.

FIG. 2 shows the host A 200 being connected by line 162 and its terminal interface 210 to the bus 202. The bus 202 of the host 200 interconnects the terminal interface 210 with the CPU 206, the DASD 208, and the memory 204. Included in the memory 204 of host 200 is the terminal buffer 214 which buffers the session being conducted with the workstation 100.

FIG. 2 also shows the second host computer 300 which is connected by means of line 164 to the workstation 100. Line 64 connects to the terminal interface 310 which connects to the bus 302 of host 300. The bus 302 interconnects the memory 304, the CPU 306, the DASD 308 and the terminal interface 310 in the host B 300. Memory 304 also includes the terminal buffer 314 which buffers the second session being conducted with the workstation 100.

Figure 3:
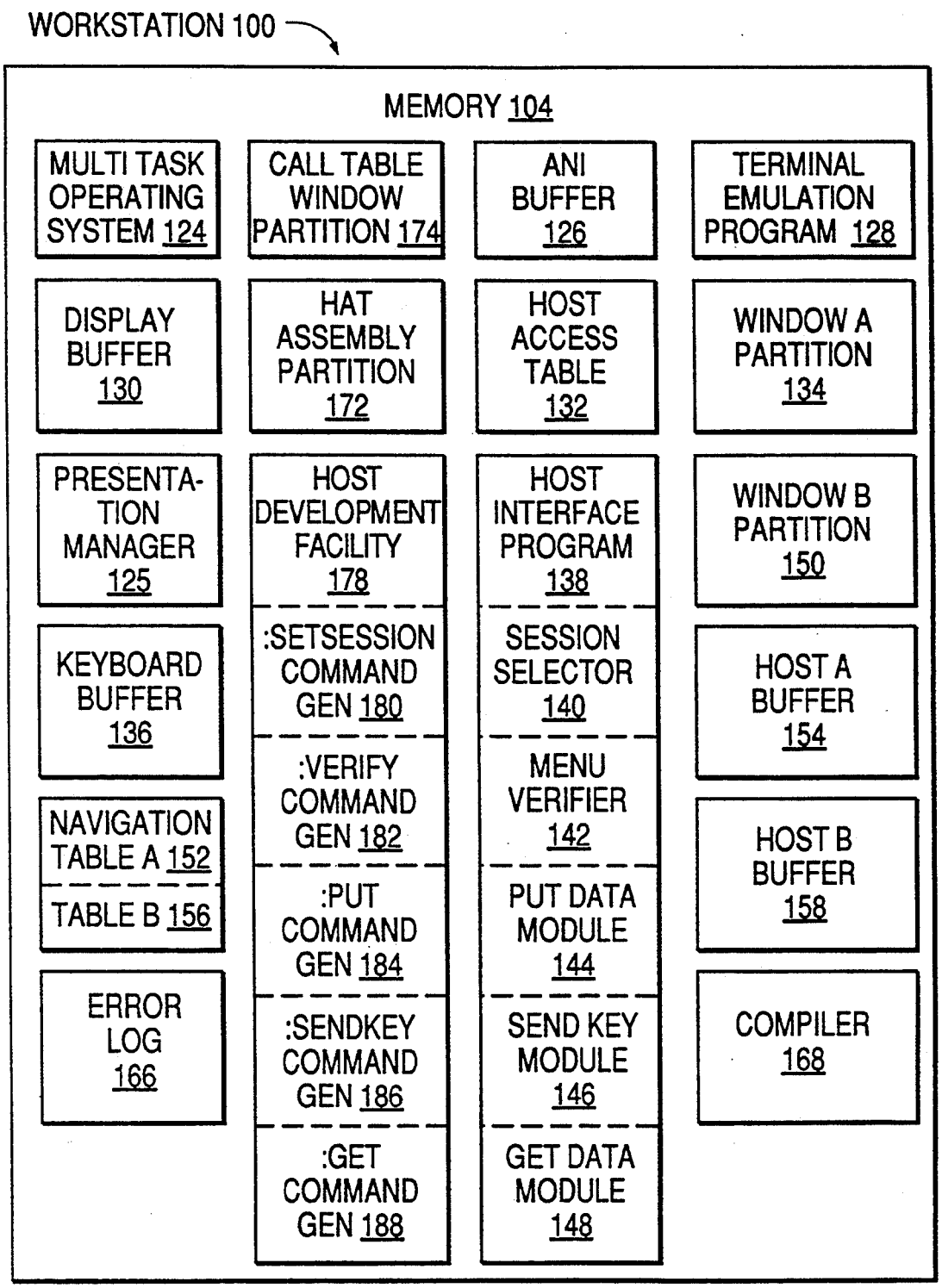
FIG. 3 shows the layout of the memory 104 for the workstation 100.

FIG. 3 is a more detailed illustration of the components of the memory 104 of the workstation 100. In the programmable interface system described in the Gursahaney, et al. patent application, the memory 104 of the workstation 100 includes the multi-task operating system 124, the ANI buffer 126, the terminal emulation program 128, and the display buffer 130. Of particular significance in the Gursahaney, et al. patent application is the host access table (HAT) 132. Also included in the Gursahaney, et al. patent application is the window A partition 134 and the keyboard buffer 136. Of particular significance in the Gursahaney, et al. patent application is the host interface program 138 which includes the session selector 140, the menu verifier 142, the put data module 144, the sendkey module 146, and the get data module 148. The Gursahaney, et al. patent application also includes the window B partition 150, the navigation table A 152, the navigation table 156, the host A buffer 154 and host B buffer 158.

Operational Mode for Programmable Interface System—Gursahancy, et al.

The operational mode for the system shown in FIG. 1, is described in the Gursahaney, et al. patent application. It is in the operational mode, that operands are automatically transferred between a host-based application program running in the host 200, for example, and the workstation 100 for the purpose of conducting call center operations.

For inbound calls, servicing time by an agent is reduced by using data obtained about the call from the telephone system 122. Use can be made of the automatic number identification (ANI), where the calling party's billing number is passed to the PBX 120. The customer's ANI number can be used as a key for data base access to a data base manager running on the host computer 200, for example, thereby reducing time required to perform customer identification.

The operational mode of the workstation 100 is controlled through the host access table (HAT) which is referred to herein as the HAT command table. The HAT command table is a file containing a series of commands that instruct the host interface program 138 how to interact with the host application program running on the host computer 200.

In the operational mode, execution of the HAT commands in the HAT command table will automatically get data from display panels sent to the workstation 100 by the host 200, put data into fields on those display panels, and generally automate the conduct of the session established between the workstation 100 and the host 200. The terminal emulation program 128 manages the session established between the workstation 100 and the host 200, by buffering the current display panel received from the host 200 in the window partition 134. If two sessions are being conducted in a multi-tasking mode with host 200 and host 300, then two terminal emulation program tasks will be run, the first communicating with host 200 using window partition 134 and the host A buffer 154, and the second terminal emulation program session communicating with the second host 300 using the window partition 150 and the host B buffer 158.

In the operational mode for the programmable interface system described in the Gursahaney, et al. patent application, the host interface program 138 executes the HAT commands in the HAT command table 132. Many of those commands invoke the transfer of simulated keystrokes from the host interface program 138 to the terminal emulation program 128, to automate manual keystrokes which would be entered by the workstation agent through the keyboard buffer 136.

Host Access Tables

Interaction between the workstation 100 and the host computer 200 is controlled by statements within the host access table (HAT) 132. These statements define the actions that are taken when a call is received and when the preprogrammed quick keys are used. Quick keys are key combinations that are used together to provide a shortcut in performing a task on the host computer 200. Quick keys can start the actions defined by a HAT when an outbound call is placed by the agent.

The HAT 132 is run each time a phone call is received or when the service representative uses certain preprogrammed quick key combinations.

For example, when a telephone call is received by a service representative, the workstation 100 receives the caller's data such as an ANI and DNIS information from the gateway 118. A part of the workstation HAT 132 defines the procedure that allows the ANI to be passed, for example, to the host session running on the host computer 200. It enters the ANI into the proper field for a menu displayed on the screen at the workstation 100, and navigates through the host application screens to the one that contains the information the representative needs to have displayed at the workstation 100.

The HAT 132 also contains a table that defines the preprogrammed quick keys. The quick keys are key combinations used to perform shortcuts in performing certain functions. The quick key actions reside in tables called quick key tables. The quick key tables are used to set up key combinations to perform specific actions in a host application.

For example, the representative or system administrator could set the key combination of "alt+0" to move to a specific screen in the host application running on the host computer 200, and perform a keyboard function such as the depression of a PF2 key. Multiple HATs 132 can be defined and the service representative can dynamically choose which HAT 132 is to be used at any moment.

The table language used to construct the host access table 132 consists of a control word and appropriate parameters. There are two types of control words. The first type is a meta control word which performs a function general to the entire table. A meta control word is executed by the table compiler. A second type of control word is the command, which performs a specific function in the table. Command control words are executed during operation of the HAT 132. Control words and their syntax are described in the following discussion.

In accordance with the invention, the HAT Development Facility is used to write the host access table 132. Once the HAT 132 has been written, it should be compiled with the table compiler. Compiling converts the tables to a form that the host interface program 138 can execute. As an alternative, the host interface program 138 can be embodied as an interpretive program which will interpret the command words in the host access table 132 at the time of execution.

Data can be passed back and forth between the workstation 100 and the host application running on the host computer 200 through the execution of the commands in the host access table 132. Four types of data can be passed to and from the host session, system variables, user variables, keystrokes and fixed data.

System variables contain text strings provided by the host interface program 138, that can be used in host applications running on the host computer 200. Examples of four system variables are as follows. The variable "% 0" provides the telephone line number of an incoming call. This variable identifies to which of 16 lines coming out of the PBX 120 the data applies. The value of this variable can be from one to 16. The second system variable is "% 1" which is the ANI or other caller identification data. This can be 10 digits for outside calls or four or five digits for internal calls. Another system variable is "% 2" which is the dialed number information service (DNIS) number that the customer called. Another system variable is "% 3" which is the service representative extension to which an incoming call has been routed by the automatic call distribution function of the PBX 120. Still another system variable is "% 4" which identifies the extension which initiated a transfer or conference call. Other system variables can also be set forth.

User variables are variables that can be used by the user to capture text strings from one host screen and place them on another. Up to 10 text strings of 80 characters can be held at one time and user variables identify "#0" to "#99." User variables can also be used to manipulate data from system variables or fixed data.

Keystrokes are used to initiate actions in a host session. The host access table 132 can initiate actions in a host session by passing a simulated keystroke. These are normally special keystrokes, such as a program function key (PF) or an enter key.

Fixed data can be specified by a specific text string which can be placed on host screens. The maximum length for such text screens is 99 characters. Text strings can contain system variables or user variables, which can be replaced with the proper values before the command is executed.

The host access table 132 contains a series of tables, and each table defines a separate set of actions. The actions that are to be performed by a table are specified in a statement. The statements control the actions to be taken and pass data to the host 200. By defining the appropriate sequence of statements, the user can pass the data to the host session, enter it in a field on a host application screen, and initiate host application actions. Each action is a statement in the host access table 132. A statement consists of a control word and an operand. Its syntax is "control word.operand."

A command control word is used within a host access table to perform an action. A statement starts with a control word. A control word can be anywhere on a line and may be expressed in uppercase, lowercase or mixed case. When a statement is written, a period must be used to separate the control word and the operand. For example: ":GET.1,6,3,#7."

The command control words, also referred to as commands, are used to send actions to the host session on the host computer 200. They begin with a colon ":" and can start anywhere on the line. However, the entire statement must be complete on one line in the host access table.

The operand may be a constant or a text string depending upon what is appropriate for the control word. All operands must be on one line and separated by commas. Text strings may be enclosed in quotation marks. For commands requiring text strings, the text string may contain system and user variables that are substituted when the host access table 132 is being executed by the host interface program 138. For example, the string "The ANI is % 1" will substitute the automatic number identifier for "% 1."

Meta control words are table compiler control words which perform general functions for an entire table and are implemented at the time of compiling a host access table. Such things as comment statements, embedding a file, and printing a compile message are typical compiler control words.

Command Control Words

An example of command control words used to construct a host access table 132 are given in the following discussion.

The command control word ":ASSIGN" assigns a value to a variable. For example, ":ASSIGN.#6,Phone Number=% 1" will perform a function at the time of the execution of the host access table 132 by the host interface program 138. The function performed will be assigning the value of the variable "#6," the string "Phone Number=" and the current value associated with the system variable "% 1" which is the ANI caller identification data.

The command control word ":COMPARE" can be used to compare the value of a variable to determine that it contains a specified text string. For example the expression ":COMPARE.#4,New Account" will be executed when the host access table 132 is executed by the host interface program 138. The function performed is to compare the value of the variable "#4" which has been taken from a host screen for example, and checked to see if it is the string "New Account." This comparison can be used to determine whether the customer's account was new.

The command control word ":IF" can be used to alter the flow of control of the operation of a host access table. In general, this command is used after a ":COMPARE" command, however it is not limited to this.

The command control word ":ENDIF" can be used with the ":IF" command to end an IF statement. When the condition for the ":IF" is true, the statements following the ":IF" command are executed, otherwise the instructions are branched around until after the ":ENDIF" command.

The command control word ":GET" can be used to get a string from the host screen displayed at the workstation 100, and assign it to a user variable. The user variable can be used later in other commands. An example is ":GET.12,10,20,#4." In this example, when the host access table 132 containing the ":GET" command is executed by the host interface program 138, the host interface program 138 will read 20 characters of text beginning in column 10 of row 12 of the current host screen being displayed in the workstation 100 window and will assign it to the user variable "#4." One can use the variable in a ":PUT" command to place the text somewhere else on the current or another screen.

The command control word ":GOTO" can be used to cause the flow of control to unconditionally change to a specified label.

The command control word ":MESSAGE" can be used to place a message in the message area on the workstation 100 main window.

The command control word ":PUT" can be used to place a string in a field on the active host screen being displayed in the current window of the workstation 100. The active screen is set by the ":SETSESSION" command. An example is ":PUT.11,23, Phone Number for #1 is % 1." In this example, the string "Phone number for Joe is 3015551212" is placed in a field that begins in row 11, column 23 on the current host screen. In this example, the user variable "#1" was previously set to "Joe" and the system variable "% 1" contained the phone number "3015551212."

The command control word ":QUICKKEY" is used to begin a table that specifies the actions to be taken when a service representative uses one of the quick keys. The ":ENDQUICKKEY" command ends the table.

The command control word ":SENDKEY" can be used to send a simulated keystroke to the active host screen. Before using this command in the table, a session must be set in the table with the ":SETSESSION" command. Examples of valid key names which can be used with the ":SENDKEY" command include "ENTER," any of the program function keys, for example "PF1," etc. As an example, ":SENDKEY.ENTER" will cause the host interface program 138 to send a simulated enter keystroke to the keyboard buffer 136.

The command control word ":SETSESSION" is used to specify the host session that the host table will use. It is assumed that the host session is configured and logged on when the host access table is run. As an example, ":SETSESSION.B" will set the active session B for the host access table 132. Sessions can be selectively reset during the execution of a host access table.

The command control word ":USER_PROMPT" is used to pause execution of the host access table 132 by the host interface program 138 to allow the user to enter data. The user can then use a key combination such as a "Ctrl+R" to resume the execution of the HAT. An example would be ":MESSAGE.Enter report number and then Ctrl+R to resume" followed by the command control word ":USER_PROMPT." In this example, the host interface program 138 places the message in the workstation 100 window and waits for the user to enter a report number in the host session and to use the "Ctrl+R" combination to continue.

The command control word ":VERIFY" can be used to check that the proper host screen is present in the current window partition for the workstation 100. The ":VERIFY" command verifies that a value which is specified is on the current displayed host screen. If the value is not on the screen, a message can be displayed and the system will wait until the user either gets to the correct screen and presses the resume key combination to resume the host access table execution, or presses a halt key combination to bypass the rest of the host access table. Alternately, the ":VERIFY" command can branch to a menu navigation program if the specified value is not on the screen, in order to automatically navigate to a desired screen which will have the specified value thereon. An example is ":VERIFY.2,5,SCR10022." In this example, the host interface program 138 checks that the screen number "SCR10022" is in row 2, column 5 on the current displayed host screen at the workstation 100.

The HAT Development Facility Invention Description

Previously, effective HAT command tables had to be written by a writer having a familiarity with the HAT command syntax, the display panel formats and operations of the host computer, and the signaling conventions of the PBX.

In accordance with the invention, the HAT Development Facility invention provides an intelligent editor for constructing HAT command tables, using online interaction with the host to automatically insert format information from the host display panels into HAT commands being created by the writer.

In order to provide the HAT Development Facility to the system administrator at the workstation 100, the memory 104 in FIG. 3 must have some additional components. The HAT assembly partition 172, the call table window partition 174, and the HAT Development Facility 178 are added to the memory 104. The HAT Development Facility 178, includes the SETSESSION command generator 180, the VERIFY command generator 182, the PUT command generator 184, the SENDKEY command generator 186, and the GET command generator 188. The compiler 168 can be used to compile the host interface program and the error log 166 will buffer errors detected in a newly written HAT.

When the workstation 100 is being used by the system administrator to construct an HAT command table, this mode of operation is referred to herein as the HAT construction mode.

The HAT construction mode of operation is conducted in a multi-tasking environment using, for example, the OS/2 Extended Edition Multi-Tasking Operating System 124. Included in OS/2 Extended Edition, is the presentation manager graphical user interface environment 125 in FIG. 3. The presentation manager 125 is described in greater detail in the following IBM publication, "IBM OS/2 Programming Tools and Information-Programming Guide," Version 1.2, 1989, publication number 64F0273, available from IBM branch offices. In the HAT construction mode, the HAT Development Facility 178 runs in a first multi-task session. The terminal emulation program 128 runs in a second multi-tasking session under the operating system 124. This allows the writer operating through the keyboard 136, to directly interact with the terminal emulation program 128 while the HAT Development Facility 178 creates the HAT commands.

Figure 7:
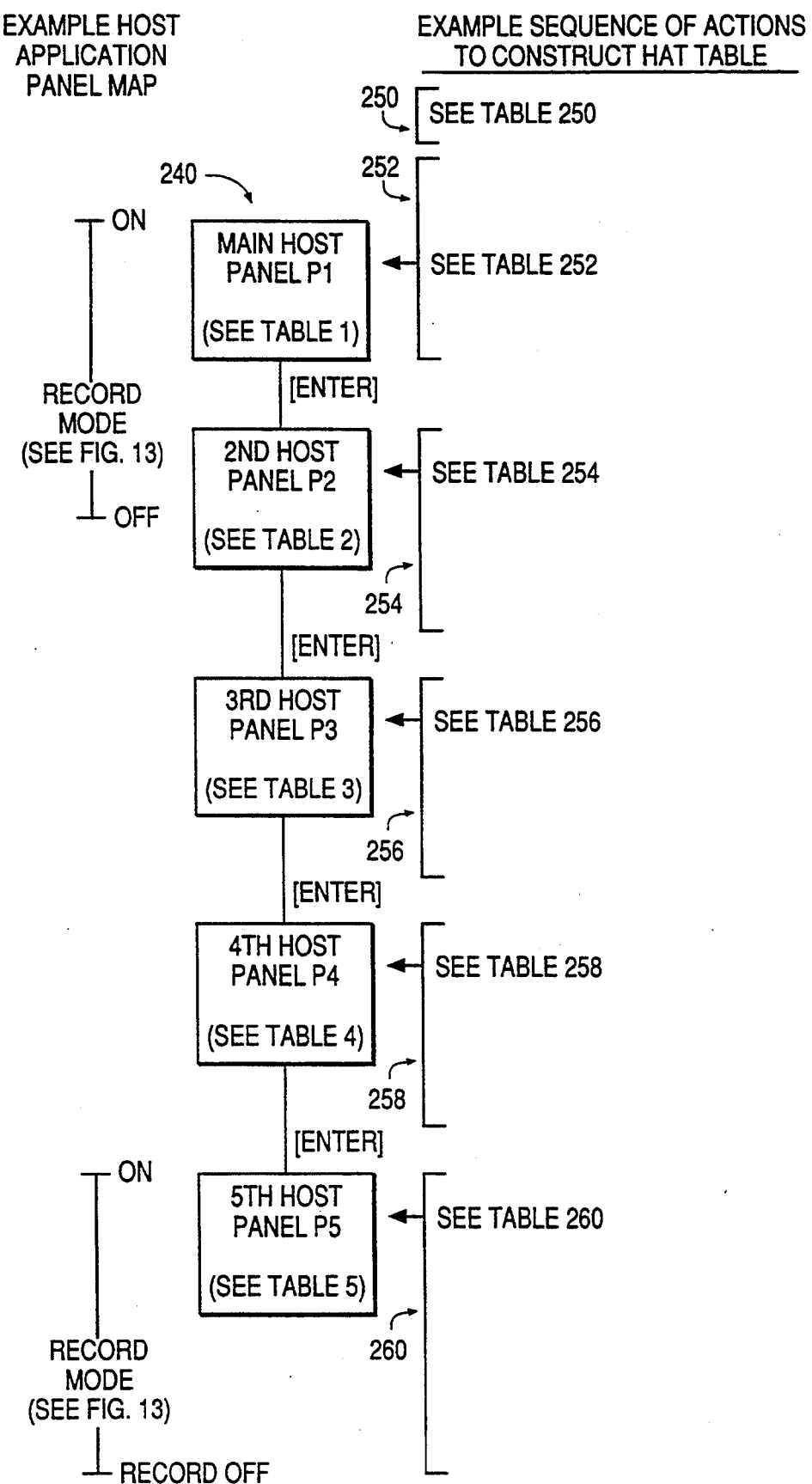
FIG. 7 is an example of a host application panel map.

An example is given herein of a host application which will serve to illustrate how the HAT Development Facility 178 is used to construct a new HAT command table. FIG. 7 shows an example host application panel map 240. Reference to the memory 204 of the host 200 in FIG. 4, will show a customer help desk program 212 running in the host 200, which generates five host panels P1, P2, P3, P4 and P5 of FIG. 7. image of the main host panel P1 stored in memory 204, can be seen in Table 1. The image of the second host panel P2 can be seen in the Table 2. The image of the third host panel P3 can be Table 3. The image of the fourth host panel P4 can be seen in Table 4. The image of the fifth host panel P5 can be seen in Table 5. The host application panel map 240 of FIG. 7 shows that once the host session is established with the workstation 100, the host 200 sends the main host panel P1 to the workstation 100, where it is buffered in host A buffer 154 of FIG. 2. When the workstation 100 instructs the terminal emulation program 128 of FIG. 3 to set the session with host A 200, the image of the main host panel P1 is buffered in the window A partition 134. If an agent sitting at workstation 100 wishes to conduct a session with the host 200 running the customer help desk program 212 of FIG. 4, in a normal manual interaction through the keyboard buffer 136 of FIG. 3, the agent could sequentially view the consecutive host panels P1, P2, P3, P4, P5 by pressing the enter key to pass to each consecutive panel, as is illustrated in the panel map 240 of FIG. 7.

In the HAT construction mode, the system administrator wishes to construct an HAT command table which will automatically sequence the session established between the workstation 100 and the host 200 through the sequence of host panels P1, P2, P3, P4 and P5. This is accomplished as follows for the example of FIG. 7.

Figure 4:
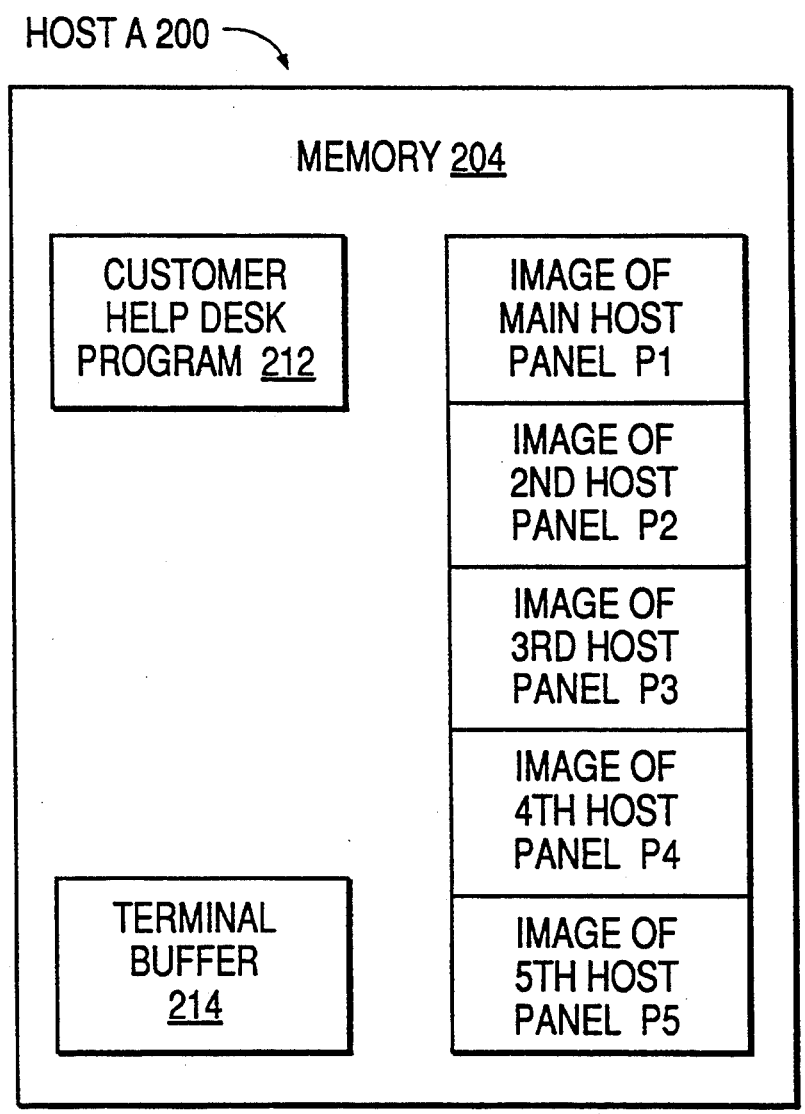
FIG. 4 shows the layout of the memory 204 for the host computer 200.
Figure 8:
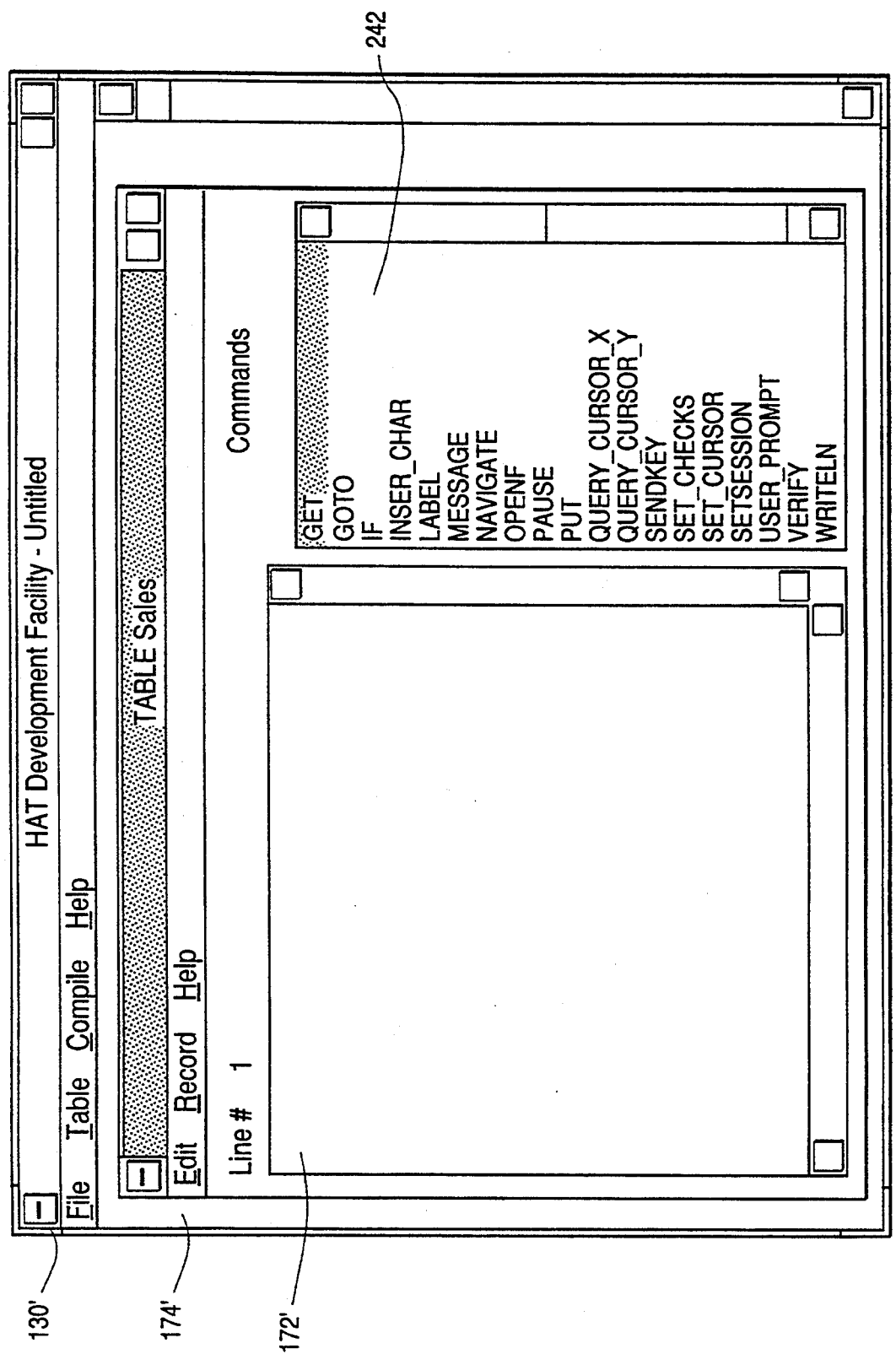
FIG. 8 illustrates the call table window for the host development facility invention.
Figure 9:
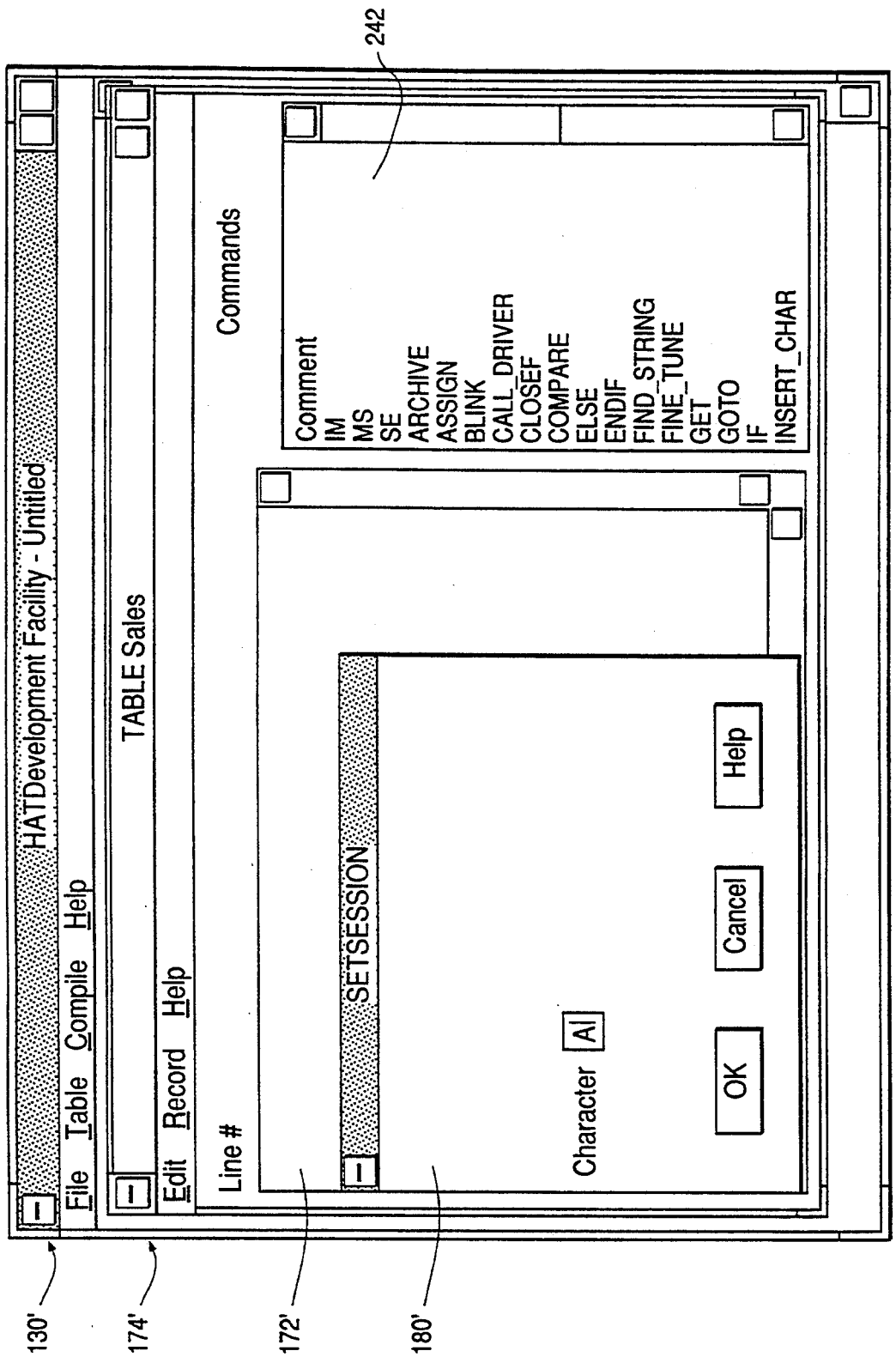
FIG. 9 illustrates the SETSESSION dialog box.
Figure 10:
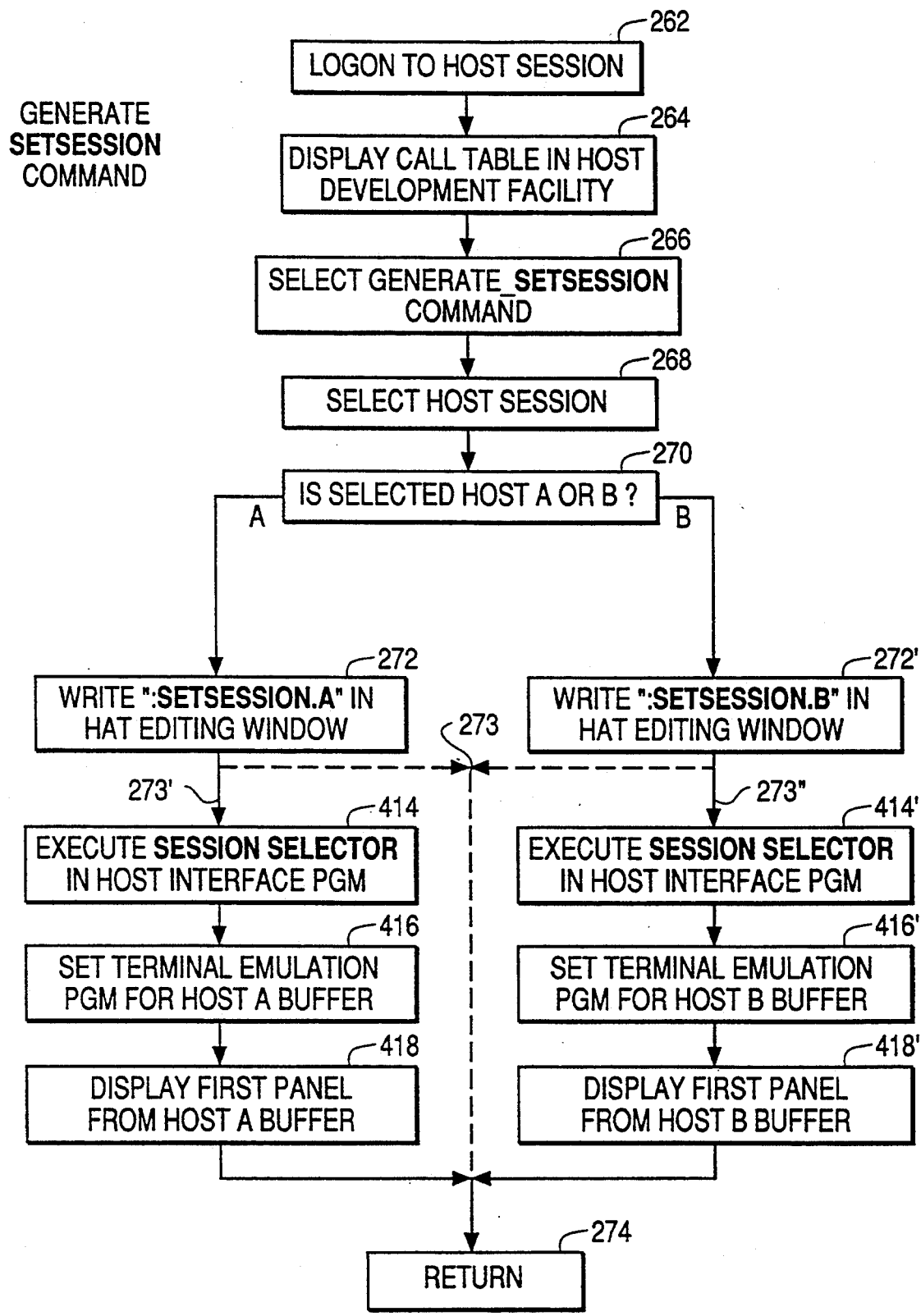
FIG. 10 is a flow diagram of the GENERATE SETSESSION command.

The customer help desk application program 212 of FIG. 4 operates in the manual agent entry mode, by having an agent enter data into the host data base in response to inbound telephone calls requesting assistance for the repair of machinery. In order for the system administrator to construct an HAT command table to perform this interaction automatically, the system administrator must initiate two active multi-tasked sessions in the workstation 100, the first session containing the agent's host session with the host 200 of FIG. 2 and the second session being with the HAT Development Facility program 178 of FIG. 3. The system administrator must select a file name for the HAT command table file to be constructed. In the session with the HAT Development Facility 178 the HAT Development Facility displays the call table window 174 of FIG. 8 which is buffered in the call table window partition 174 of the memory 104 of FIG. 3. The call table window, shown in FIG. 8, is composed of two subsidiary windows. The command selection window 242 is shown in call table window 174' and the HAT editing window 172' is shown in the call table window of FIG. 2. The HAT editing window 172' is stored in the HAT assembly partition 172 of the memory 104. The command selection window 242 contains a list of HAT commands which are available for the type of HAT command table being constructed. A partial list of HAT commands described above are included in the list presented in the HAT command window 242 of FIG. 2. As is seen in FIG. 7, these steps are represented by the steps in group 250 of the example sequence of actions to construct the HAT table. Group 250 is shown in Table 250. These steps are to log on to the host application program 212, then start the HAT Development Facility program 178, and then to open a call table window as is shown in FIG. 8. The next set of steps shown in FIG. 7 correspond to the preparation of the HAT commands for processing the main host panel P1, those steps being shown in group 252. Group 252 is shown in Table 252. With the call table window being displayed on the workstation display device, the system administrator would select as the first command, the SETSESSION command. By designating the SETSESSION command in the command window 242 of the call table window of FIG. 2, the setsession dialog box 180' is displayed, by the SETSESSION command generator 180 in the HAT Development Facility 178. The setsession dialog box 180' is shown in FIG. 9 and the flow diagram of the SETSESSION command generator 180 is shown in FIG. 10. The dialog box 180' is presented to enable the system administrator to select which session is to be invoked by the HAT command table, either a session with host A 200 or alternately with host B 300.

In the flow diagram of FIG. 10, the GENERATE SETSESSION command sequence starts with step 262 to be sure that the system administrator has logged to the appropriate host session. Then in step 264, the call table window is to be displayed by the host development facility. Then in step 266, the system administrator will select the GENERATE SETSESSION command. Then in step 268, the system administrator will select which host session he desires. Step 270 is the decision box which determines whether host session A for the host 200 or host session B for the host 300 has been selected. If host 200 has been selected, then step 272 writes the SETSESSION.A HAT command in the HAT editing window 172'. This HAT command becomes the first command in the sequence being created for the new HAT command table. Then the program proceeds over path 273 to step 274 which returns to the main program in the HAT Development Facility 178. The HAT command table in this stage is shown in Table E1.

Figure 11:
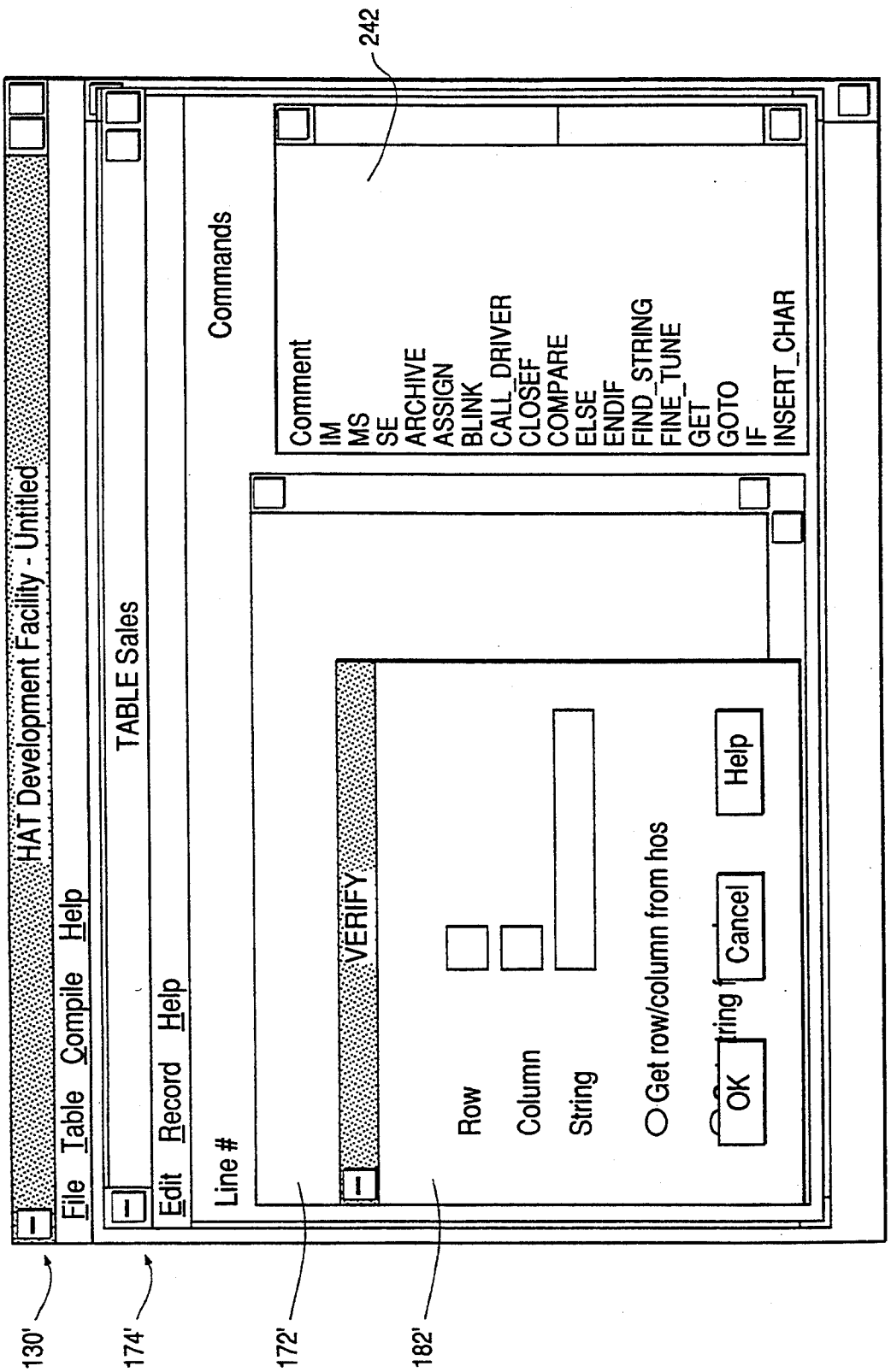
FIG. 11 illustrates the verify dialog box.

Next, the system administrator wishes to be sure that the agent using the system during the operational mode, will be on the main host panel P1. Since each host panel contains some unique data which will distinguish it from its other panels, the system administrator can check if that data is present and thereby verify that the correct panel is being displayed to the agent during the operational mode. To achieve this, the system administrator selects the VERIFY command from the command selection window 242 of the call table window, which results in the HAT Development Facility 178 displaying the verify dialog box 182', as is shown in FIG. 11. The VERIFY command generator 182 of the HAT Development Facility 178 has its flow diagram shown in FIG. 12. The display buffer 130 displays the image 130' of the HAT Development Facility window, within which the call table window 174' is positioned.

Figure 12:
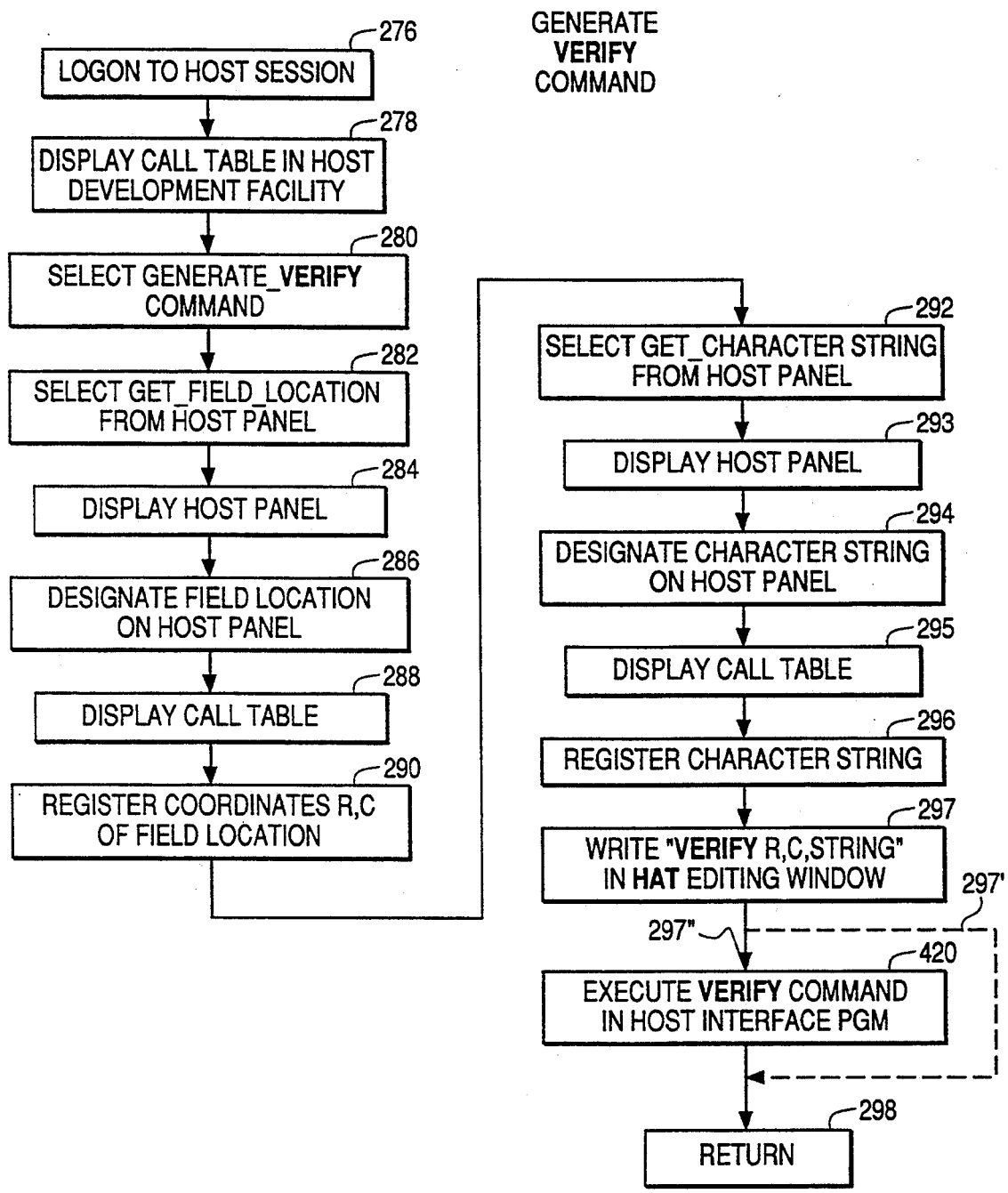
FIG. 12 is a flow diagram of the GENERATE VERIFY command.

The VERIFY command generator 182 has its flow diagram of FIG. 12 start at step 276 which makes sure that the system administrator is logged on to the proper host session. Then in step 278, display the call table 172' by the host development facility. Then in step 280, the system administrator selects the GENERATE VERIFY command. Then in step 282, the system administrator must identify the field location of the characteristic string which will be used to verify the presence of the intended main host panel P1. To do this, the system administrator selects in the verify dialog box 182', to get the row and column from the host. By making this selection, the HAT Development Facility in step 284 switches the session window being displayed in the display buffer 130, to display the panel P1 which is buffered in the window partition 134 managed by the terminal emulation program 128. The system administrator then places his cursor in step 286, as directed by a mouse pointing device, at the start of the data that he wants to use for verification on the host panel. Then the system administrator repositions the cursor to the other side of the data so as to encompass the field. The presentation manager graphical user interface environment 125 captures the coordinates R,C of the designated field and buffers them. Then next in step 288 of the flow diagram of FIG. 12, the call table 174' is displayed and it can be seen that the HAT Development Facility 178 in step 290 has registered the coordinates of the row and the column for the beginning of the field. Next, the characters in the string contained in the field are to be put in the verify dialog box 182'. This operation can be conducted by the presentation manager 125, by performing in steps 292 to 296, a copy and paste operation, copying the string from the panel P1 in the host session, and pasting the string in the string field of the verify panel 182', in the HAT Development Facility session. Then, when the system administrator presses the OK dialog button in the verify dialog box 182', box 182' is removed from the screen and a VERIFY command is entered into the next line in the HAT editing window 172', as can be seen in Table E2. These steps correspond to the flow diagram step 290 registering the coordinates of the field location, step 292 selecting the character string from the host panel, step 293 displaying the host panel, step 294 designating the character string on the host panel, step 295 displaying the call table, step 296 registering the character string, step 297 writing the VERIFY command in the HAT editing window 172'. The program in the first embodiment, then goes to step 298 which returns to the main HAT Development Facility program 178, over path 297'.

When panel P1 was transmitted from the host 200 to the workstation 100, the panel included information which placed the cursor on the command line whose row, column coordinates are R,C=24,7. The system administrator now wishes to enter HAT commands into the HAT command table which will automatically insert the telephone caller's ANI telephone information into the command line of panel P1. The system administrator will want to place a PUT command into the HAT table. He elects to do this by placing the HAT Development Facility 178 into the record mode. The HAT Development Facility invention provides a record mode, to record the sequence of keystrokes of the writer and to automatically identify when combinations of those keystroke sequences require multiple HAT commands to execute the intended function to be performed.

The record mode of the HAT Development Facility invention allows the writer to work with the online host display panel and to tab through the fields of the panel. The writer can enter character strings at the keyboard and each a cursor positioning or a host action key is pressed, one or more HAT commands are automatically created and written into the HAT command table with the character strings having the required syntax.

Figure 13:
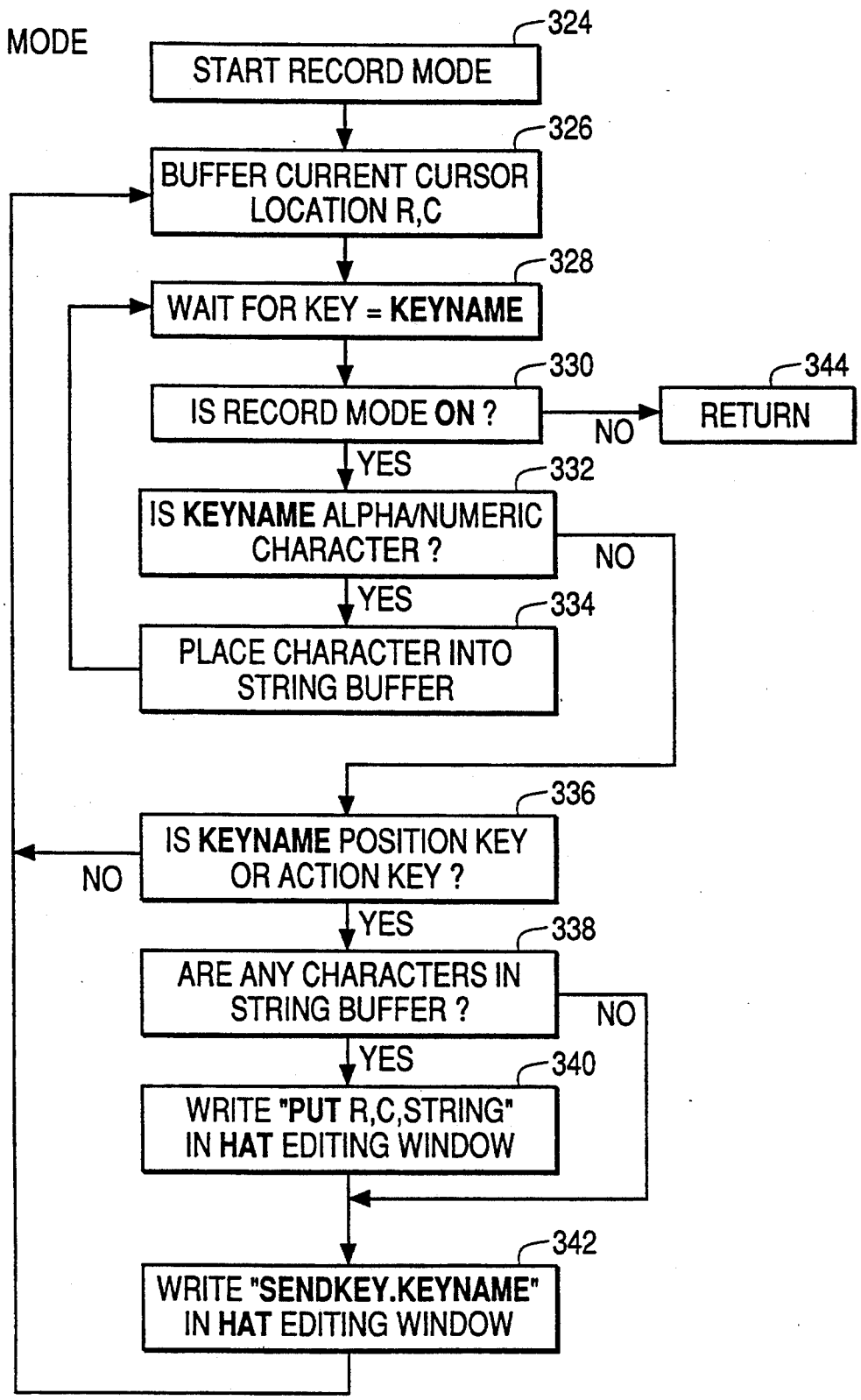
FIG. 13 shows the combination of FIGS. 13A, 13B, 13C and 13D, which illustrate the flow diagram of the record mode.

When the system administrator elects to enter into the record mode, the HAT Development Facility 178 will invoke the record mode flow diagram shown in FIG. 13. It is the objective of the system administrator to automatically generate a PUT command followed by a SENDKEY command as is shown in the group 252 of FIG. 7 (see Table 252).

In the flow diagram of FIG. 13, step 324 starts the record mode. Then step 326 buffers the current cursor location for the row, column referred to as R,C. Then in step 328, the HAT Development Facility 178 waits for a key to be pressed. In the record mode, the keys which are depressed for the keyboard buffer 136, are passed out through the presentation manager 125 directly to the terminal emulation program 128, in a first multi-tasking session. The HAT Development Facility 178 monitors and traps the key characters which are pressed, in its operation in a second multi-tasking session. Thus in step 328, the HAT Development Facility 178 waits for a key to be pressed in the keyboard buffer 136.

When a key has been pressed, the HAT Development Facility 178 determines whether the record mode is still on in step 330. If it is, then the program proceeds to step 332 to determine whether the key, which has been equated with the variable KEYNAME, is an alphanumeric. If it is an alphanumeric character, then the character is placed into the string buffer in step 334 and the program returns to the wait state in step 328. However, if step 332 determines that the key is not an alphanumeric character, then the program goes to step 336. In step 336, it is determined whether the key, as represented by the variable KEYNAME, is a position key or an action key. A position key will be for example a backspace or a tab key. An action key would be for example an enter key or a function key. If step 336 determines that the key is a position or an action key, then the program flows to step 338. In step 338, it is determined whether there are any characters in the string buffer and if there are, then the program flows to step 340 which writes a PUT command which includes the coordinates R,C and the string whose characters have been accumulated in the string buffer. If the position key or action key has been pressed and there are no characters in the string buffer, then step 338 flows to step 342. If either step 338 or 340 flows to step 342, then the SENDKEY command is written into the HAT editing window. The SENDKEY command will include the key as represented by the variable key name. Then the program flows back to step 326 which buffers the current cursor location R,C. In step 330, if the record mode is determined to be off, then the program goes to step 344 which returns to the main program in the HAT Development Facility 178.

In the example of FIG. 7, the string typed by the system administrator and buffered in the keyboard buffer 136 is "13,8,% 1,2,VID/PCS/PRT,90". Then the system administrator presses the enter key. In accordance with the invention, the record mode in FIG. 13 generates the PUT command PUT.24,7,"STRING". This PUT command is then followed by a SENDKEY command SENDKEY.ENTER. See Table E3 for the resulting set of commands which have been written into the HAT edit window 172'.

In referring to the host application panel map 240 of FIG. 7, it can be seen that when an enter key character is passed to the terminal emulation program 128, it results in sending the main host panel P1 from the workstation 100 to the host 200 for processing by the customer help desk program 212. In response, the host application program 212 returns the second host panel P2 to the workstation 100, as is depicted in Table 2. The second host panel P2 is displayed in the display buffer 130 when the system administrator is in the host multi-task session in the workstation 100. Since the system administrator has elected to remain in the record mode, the steps in the group 254 of FIG. 7 are carried out by the system administrator directly interacting with the terminal emulation program 128 in a first multi-task session and the HAT Development Facility 178 running in a second multi-task session monitoring and trapping the characters generated by the system administrator. Group 254 is shown in Table 254.

The second host panel P2 starts with the cursor at the row, column position R,C=7,7. As is seen in FIG. 7, the group 254 instructions (see Table 254), the system administrator presses the back tab key to reposition the cursor. In response to this, the flow diagram of FIG. 13 generates a SENDKEY command SENDKEY.BACKTAB. Then the cursor is reset to R,C=24,7 by the terminal emulation program 128. The system administrator wishes to place the string "PTR" at the command line, so the system administrator types in the string "PTR" and step 332 of FIG. 13 determines that these are alphanumeric characters and so they are placed into the string buffer. Then, the system administrator wishes to use the tab key to reposition the cursor back to location R,C,=7,7. Since the key is a positioning key, step 336 of FIG. 13 flows to step 338 which determines that the characters "PTR" are in the string buffer. Thus, step 340 writes two consecutive commands in the HAT editing window 172'. The first is written by step 340 which writes a PUT command PUT.24,7,PTR. This immediately followed by step 342 writing a SENDKEY command SENDKEY.TAB in the edit window 172'. Then the terminal emulation program 128 resets the cursor to the desired location R,C=7,7. This can be seen in the example shown in FIG. 7 for the group 254 instructions (see Table 254).

Next, the system administrator wishes to place a "s" character at location 7,7 and that will conclude the system administrator's use of the panel P2 and therefore the system administrator will press the enter key. When the system administrator presses the "s" key, step 332 determines if this is an alphanumeric character and so it is placed in the string buffer. When the system administrator presses the enter key, step 336 determines that this is action key and step 338 determines that the string "s" is in the string buffer, so therefore two consecutive commands are written into the edit window 172', a PUT command and a SENDKEY command. The PUT command is written by step 340 as PUT.7,7,s. Then immediately thereafter the SENDKEY is written by step 342 as SENDKEY.ENTER. See Table E4 for the state of the HAT edit window 172'. The terminal emulation program 128 receives the "s" character and the enter key character and responds by sending panel P2 to the host 200.

As is shown in the example in FIG. 7, at this point after the enter key has been pressed sending the second host panel P2 to the host computer 200, the system administrator turns the record mode off. Thus, the step 344 in FIG. 13 returns the program to the main program in the HAT Development Facility 178.

For the third host panel P3, see Table 3. The system administrator will wish to retrieve some information from the third host panel P3 and therefore the system administrator has turned off the record mode and will be using the dialog mode for generating HAT commands. The terminal emulation program 128 will occupy a first multi-task session and the HAT Development Facility 178 will occupy a second multi-task session in workstation 100. The presentation manager 125 will transfer keystrokes from the keyboard buffer 136 to the HAT Development Facility 178 in the dialog mode. The terminal emulation program 128 will have its host panels displayed by presentation manager in the host terminal emulation session, however the primary interaction between the user and the host panels will be through the use of a mouse pointing device to designate areas on the panel in the terminal emulation session for obtaining coordinates of fields and for copying strings of characters from the panel to use in the HAT Development Facility 178. The first step which the system administrator wishes to perform is to copy a comment from the host panel to be placed in the HAT command table being constructed. This is performed using a command dialog box which is selected from the command window 242. The command dialog box is not shown.

Figure 14:
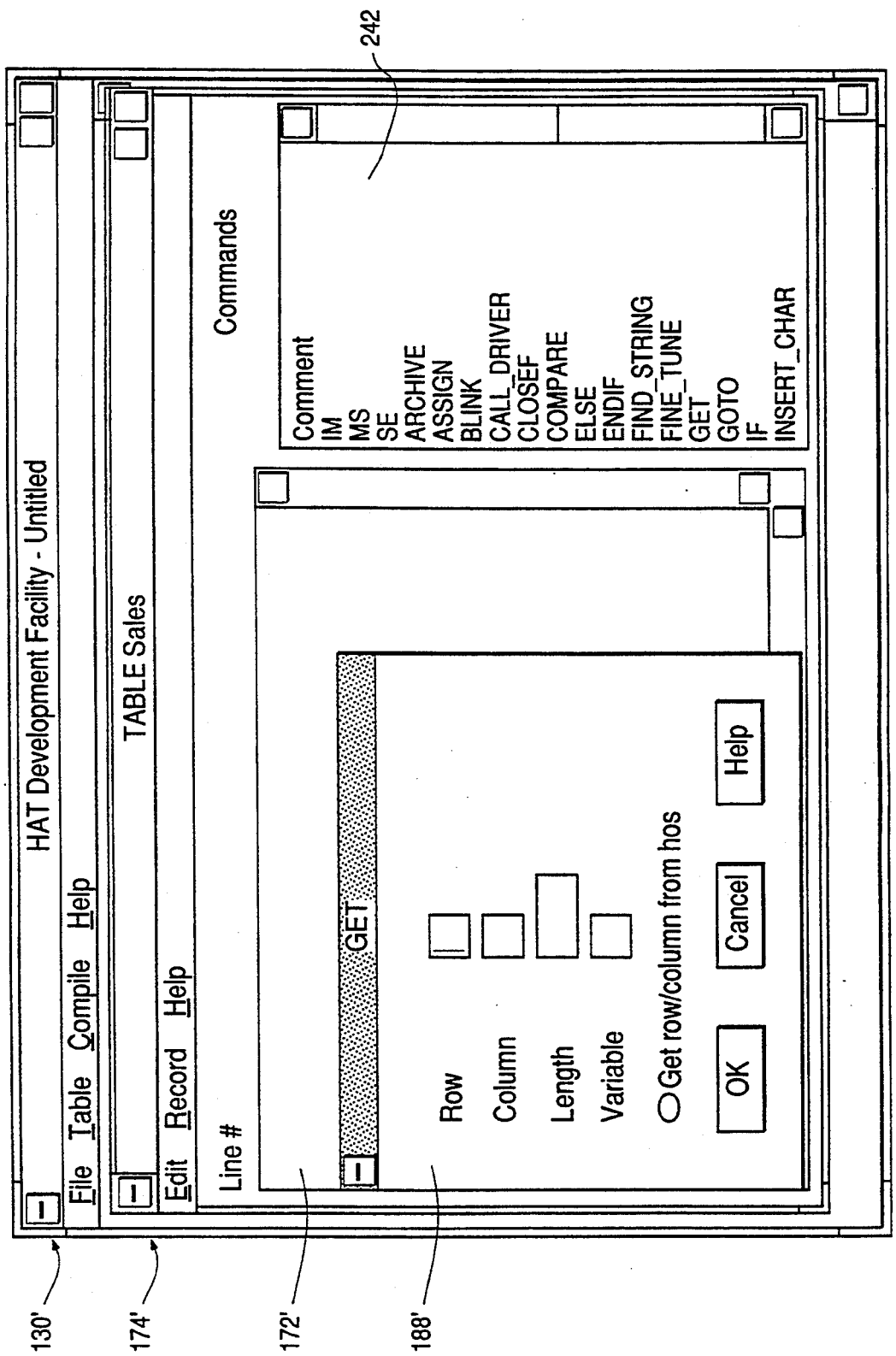
FIG. 14 illustrates the get dialog box.

Next the system administrator wishes to get some data from the host panel P3 and set it equal to the variable "#1." To accomplish this, the system administrator selects the GET command from the command window 242 and in response to this, the HAT Development Facility 178 uses the GET command generator 188 to display the get dialog box 188' shown in FIG. 14. The system administrator then indicates on the get dialog box 188' that he wishes to use his mouse pointing device to identify the row and column of the field on the host panel P3 where he would like to obtain the desired data. In response to this, the HAT Development Facility 178 displays the host panel P3. Referring to the FIG. 15, the flow diagram shows the GENERATE GET command. The flow diagram starts with step 346 which makes sure that the appropriate host session is logged on. Then in step 348, the call table 174' is displayed. Then in step 350, the system administrator has selected the GENERATE GET command which produces the dialog box 188'. Then in step 352, the system administrator selects the get field location option from the get dialog box 188'. This results in step 354 in which the host panel P3 is displayed. Then in step 356, the system administrator uses his mouse pointing device to designate the field location on the host panel P3. Then in step 358, in response to this, the HAT Development Facility 178 displays the call table 174'. In step 360, the HAT Development Facility 178 registers the coordinates R,C of the field location which was designated on the host panel P3 by the system administrator.

Figure 15:
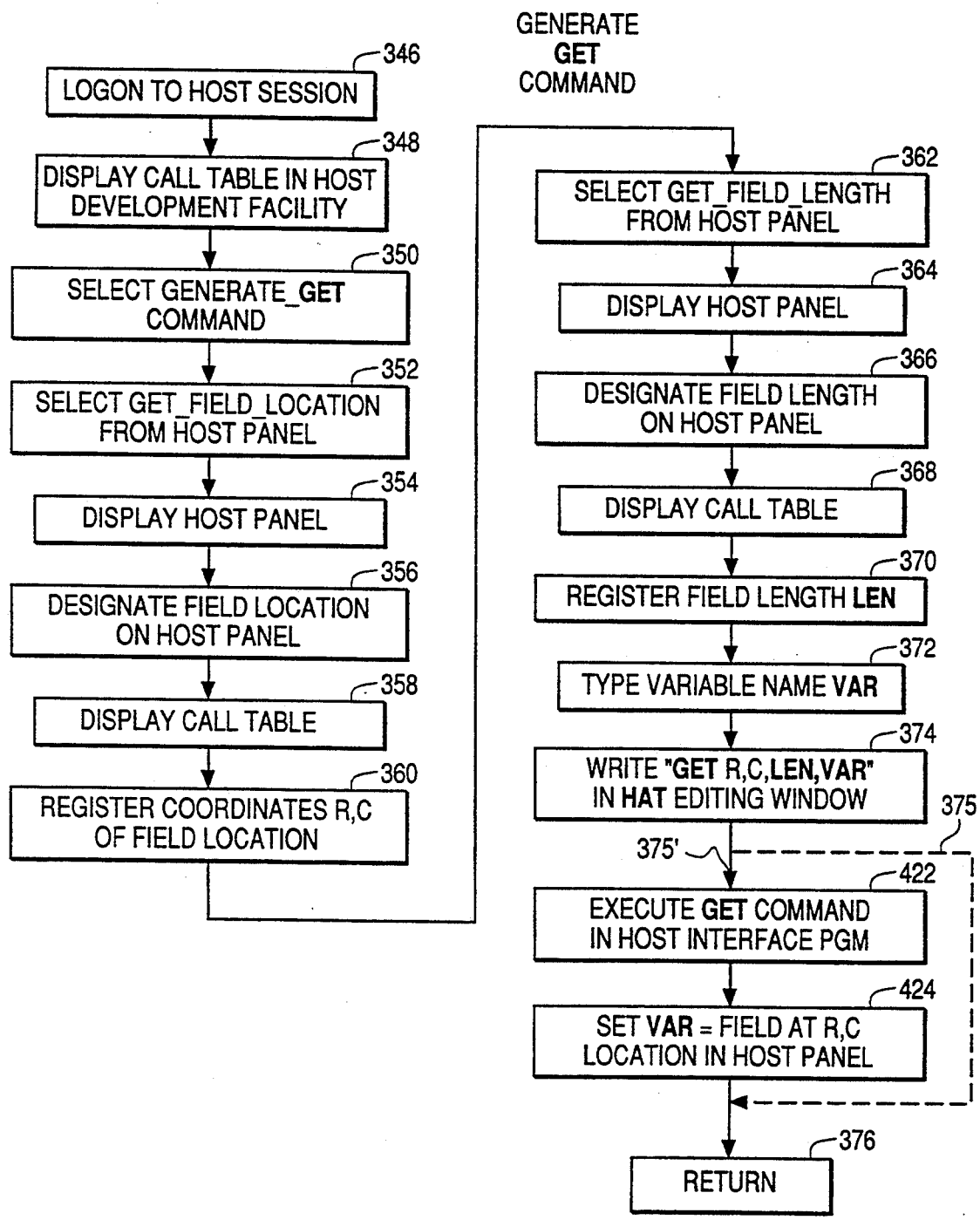
FIG. 15 is a flow diagram of the GENERATE GET command.

Then, step 362 of FIG. 15 has the system administrator select the get field length option from the get dialog box 188'. In response to this, the HAT Development Facility 178 displays the host panel with step 364. Then in step 366, the system administrator designates the field length that he wishes to get off the host panel P3. In response to this, step 368 displays the call table 174'. In step 370, the field length LEN is registered in the get dialog box 188'. The HAT Development Facility 178 will set the contents of the field designated by the system administrator on the panel P3, to a variable, so in step 372, the system administrator must type in the name of the variable. Then in step 374 the HAT Development Facility 178 writes the GET command GET.R,C,LEN,VAR into the HAT editing window 172'. This can be seen in Table E5. Then, the flow diagram of FIG. 15 passes over path 375 to step 376 which returns the program to the main program of the HAT Development Facility 178.

A similar operation is repeated to generate another comment line in another GET command in the HAT edit window 172', as is indicated in the sequence of steps in the group 256 of FIG. 7. Group 256 is shown in Table 256.

Figure 16:
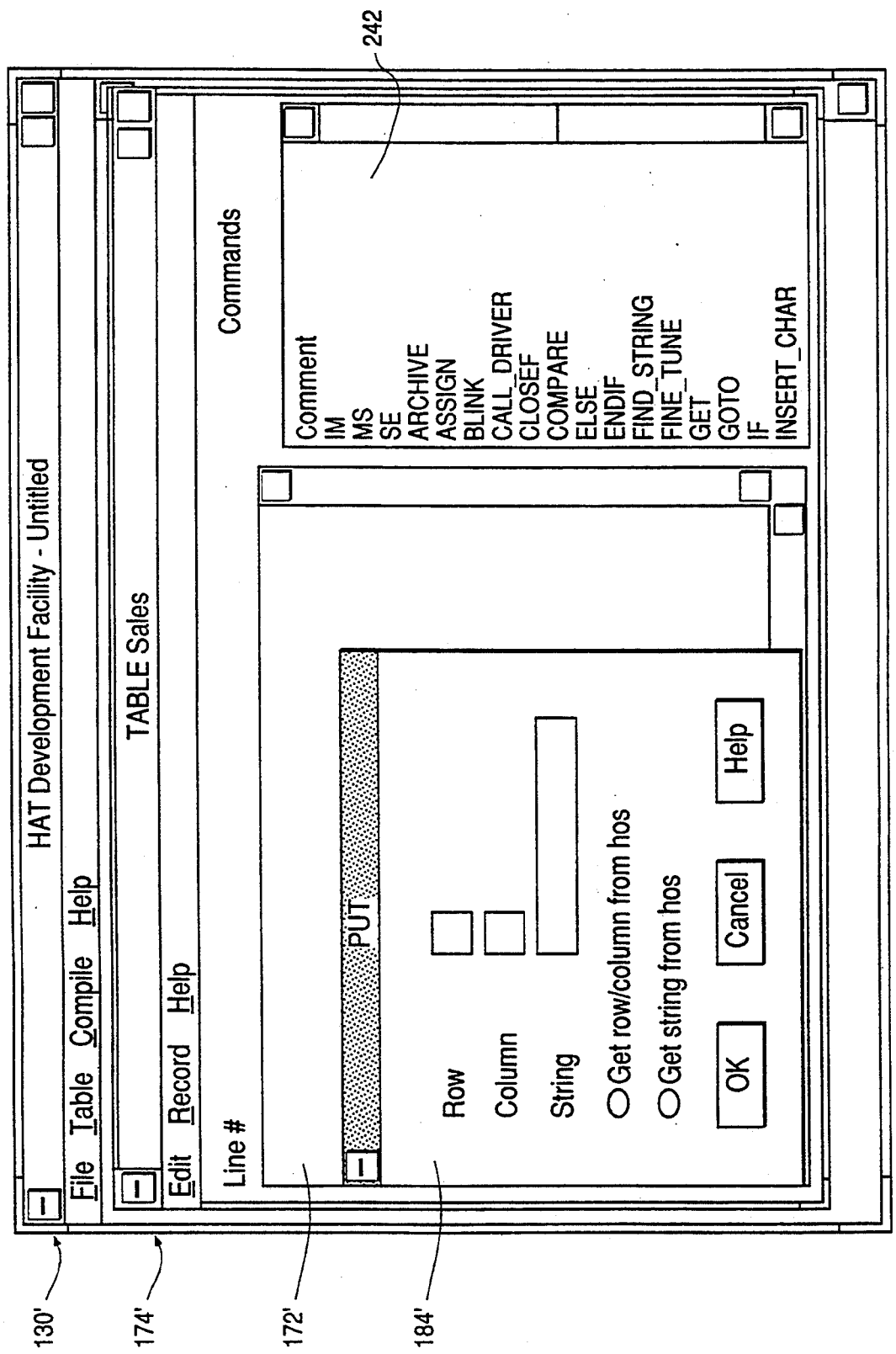
FIG. 16 illustrates the put dialog box.
Figure 17:
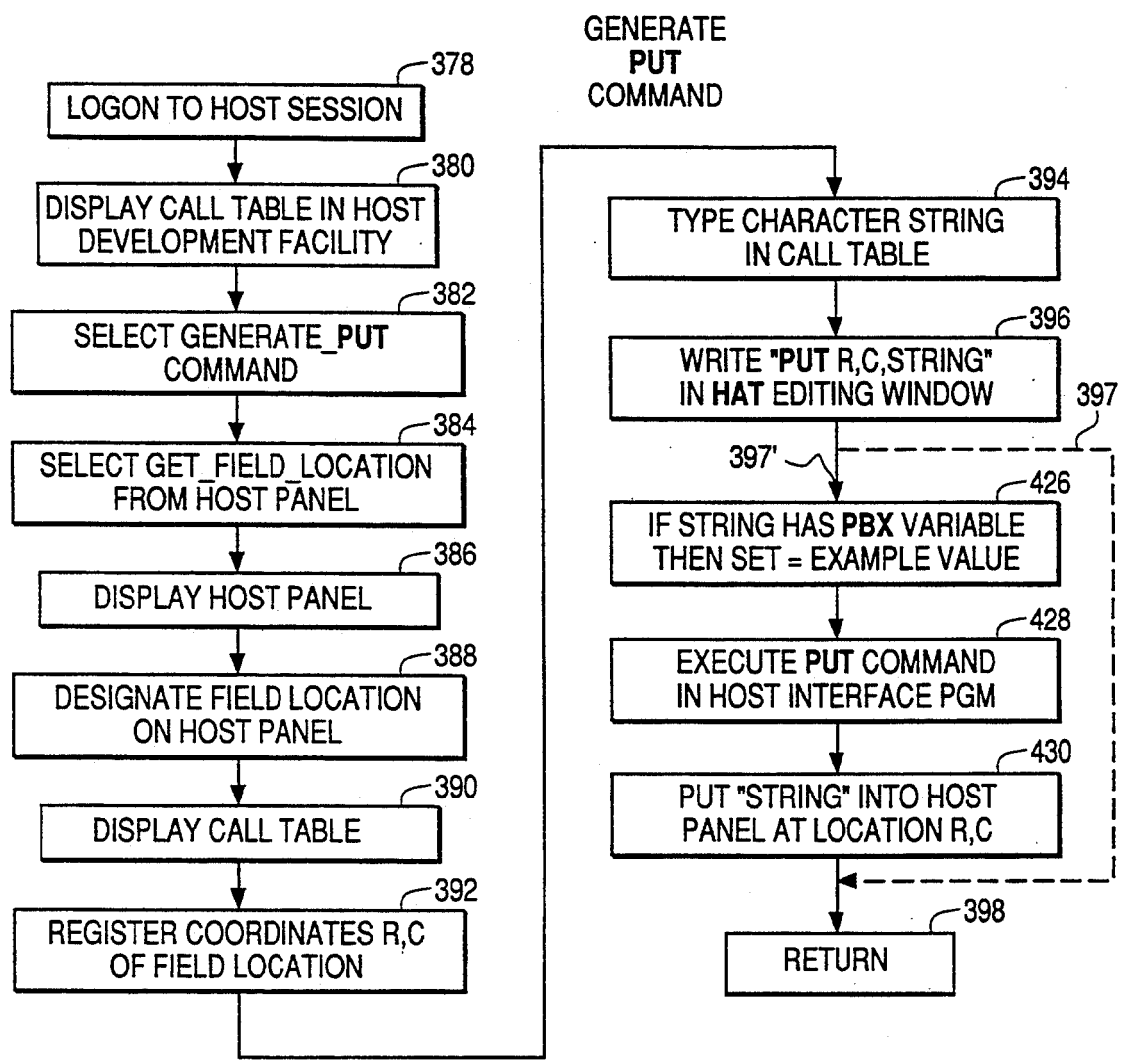
FIG. 17 illustrates the GENERATE PUT command.

Next, the system administrator wishes to enter a PUT command into the HAT editing window 172' by means of the dialog mode. The system administrator wishes to enter the character "2" at the location R,C=1,7 of the third host panel P3 and then to press enter to send the panel P3 to the host. To do this in the dialog mode, the system administrator selects the PUT command from the command window 242 of the call table window 174', which results in the HAT Development Facility 178 displaying the put dialog box 184', as is shown in FIG. 16. The flow diagram of FIG. 17 shows the GENERATE PUT command. In step 378, it is checked to be sure that the workstation is logged on to the host session. Step 380 displays the call table 174'. In step 382, the system administrator selects the GENERATE PUT command which results in the display of the dialog box 184'. Then in step 384, the system administrator selects the option of getting the field location from the panel P3 where the system administrator wishes to place his data. In step 386, the HAT Development Facility responds by displaying the host panel P3. Then in step 388, the system administrator designates the field location on the host panel by using his mouse pointing device. Then in step 390, the HAT Development Facility 178 responds by displaying the call table 174'. In step 392, the coordinates R,C of the field location which were designated in step 388, are registered in the put dialog box 184'. Then in step 394, the system administrator will type the character string into the call table. In this example, the system administrator types the character "2." Then in step 396, the HAT Development Facility 178 responds by writing the PUT command PUT.1,7,"2" into the HAT edit window 172'. See Table E5.

Figure 18:
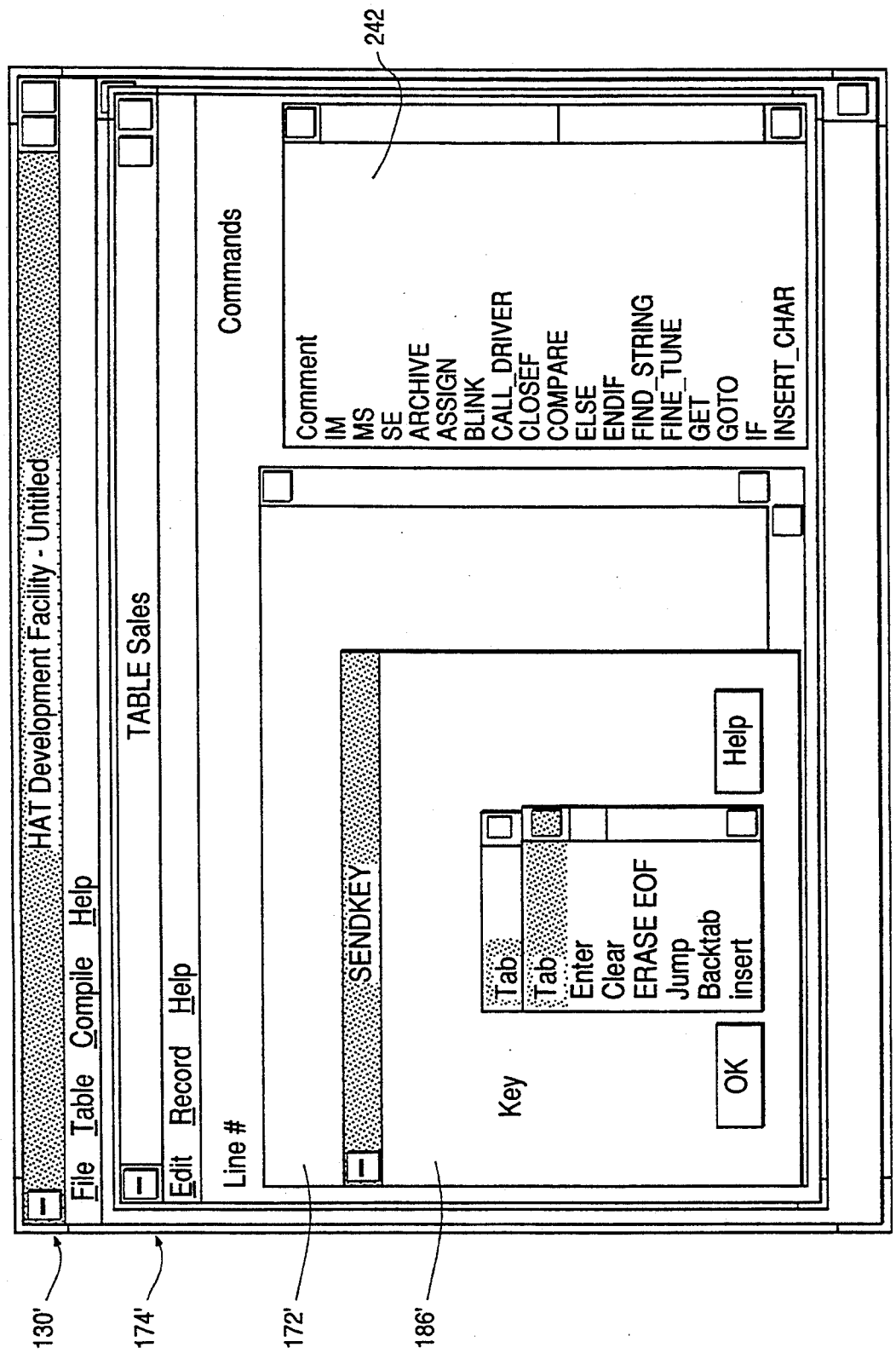
FIG. 18 illustrates the sendkey dialog box.
Figure 19:
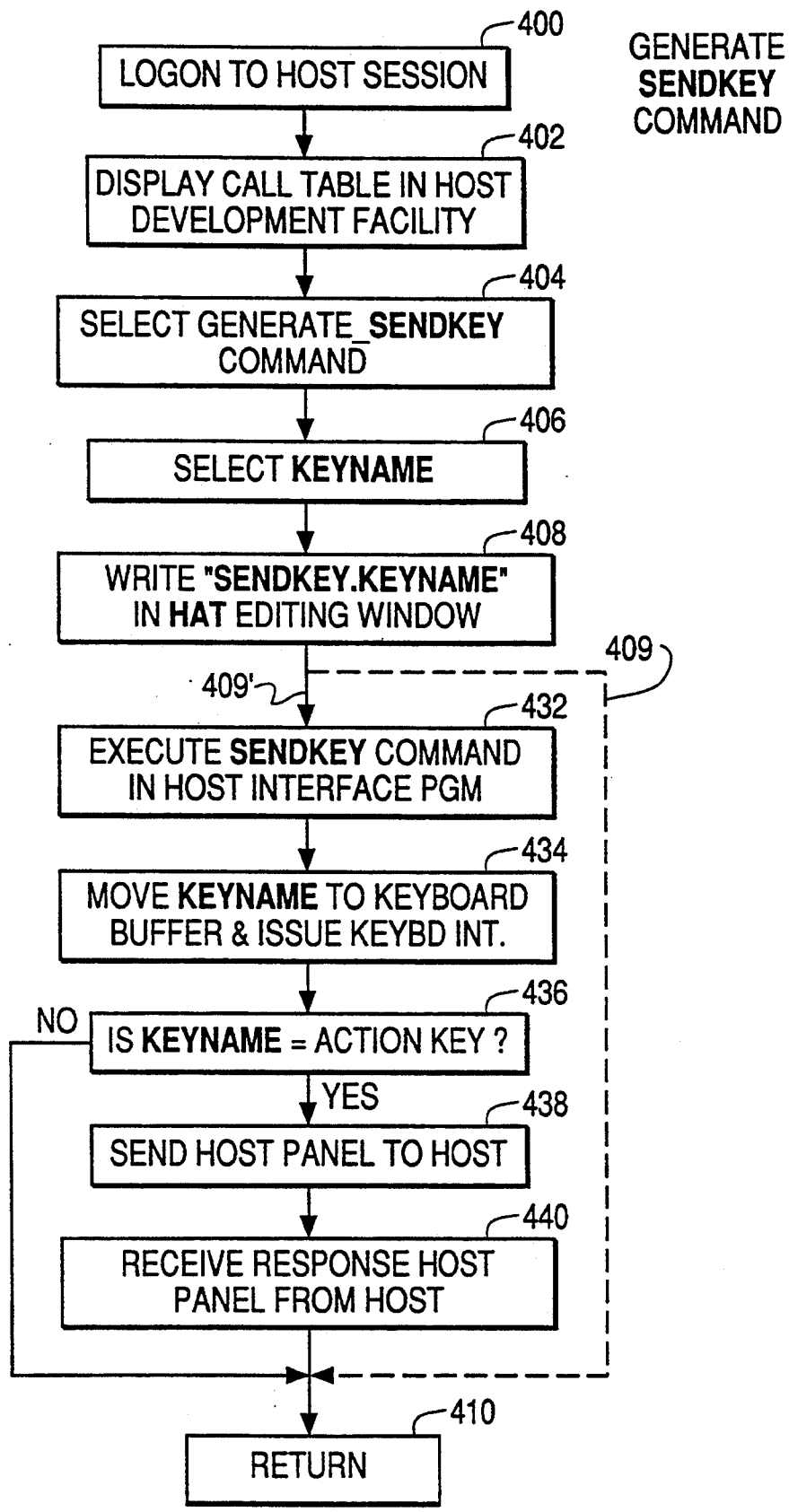
FIG. 19 illustrates a flow diagram of the GENERATE SENDKEY command.

Next, the system administrator wishes to provide for the enter key and therefore selects the SENDKEY command from the command window 242 of the call table window 174'. This results in the HAT Development Facility 178 displaying the sendkey dialog box 186' shown in FIG. 18. The GENERATE SENDKEY command flow diagram is shown in FIG. 19. Step 400 begins by checking to see if the host session has been logged on. Then in step 402, the call table is displayed. Then in step 404, the system administrator selects the GENERATE SENDKEY command, which results in the display of the sendkey dialog box 186'. Then in step 406, the system administrator selects which key he wishes to transmit to the host from the sendkey dialog box 186'. The variable key name is then set equal to the selected key character. Then in step 408, the SENDKEY command SENDKEY.ENTER is written as the next line in the HAT edit window 172', the enter key being the key character selected in step 406. Then the program flows over path 409 to step 410 which returns to the main program of the HAT Development Facility 178. See Table E5 for the appearance of the HAT edit window 172'at this stage.

As is indicated in FIG. 7, by pressing the enter key, the terminal emulation program 128 will respond by sending the host panel P3 to the host 200. In response to this, the host 200 will send the fourth host panel P4 back to the workstation 100 and it will be buffered in the window partition 134. The terminal emulation 28 will display the fourth host panel P4 in the display buffer 130.

The system administrator would like to get five pieces of data from the fourth host panel P4 and set them equal respectively to five variables. Following this, the system administrator wishes to press the enter key to send the panel P4 back to the host 200. In order to accomplish this, the system administrator elects to use the dialog mode and uses the procedure set forth above for selecting the GET command five consecutive times from the command window 242, which results in carry out the operation performed in the flow diagram of FIG. 15, five consecutive times to generate the five consecutive GET commands shown in Table E6.

This is followed by the system administrator selecting the SENDKEY command from the command table 242 and designating the enter key as the key character to be sent, as was described above, for the flow diagram of FIG. 19. The resulting state of the HAT edit window 172' is shown in Table E6. The instruction group 258 of FIG. 7 represents the operations on the fourth host panel P4. Group 258 is shown in Table 258. As a result of transmitting the enter key character to the terminal emulation program 128, the fourth host panel P4 is transmitted to the host computer 200.

In response, the host 200 sends back to the workstation 100, the fifth host panel P5 which is shown in Table 5. As is seen in FIG. 7, the system administrator wishes to execute eight PUT commands, putting data in eight different fields on the host panel P5. Thereafter, the system administrator wishes to set the cursor to a desired point in the panel P5 and present a message to the agent who will be using the HAT command table in an operational mode. The system administrator elects to use the record mode of FIG. 13, to generate seven consecutive PUT commands in the HAT edit window 172'. The system administrator accomplishes this by invoking the record mode of FIG. 13, as was discussed previously. The seven PUT commands are generated as is shown in the instruction group 260 of FIG. 7, resulting in the Table E7. Group 260 is shown in Table 260.

For the eighth PUT command, the system administrator elects the dialog mode. In the dialog mode, the system administrator selects the PUT command from the command window 242. The system administrator generates the eighth PUT command using the dialog mode flow diagram shown in FIG. 17. This results in the eighth PUT command being written into the HAT edit window 172' as is shown in Table E7.

Figure 20:
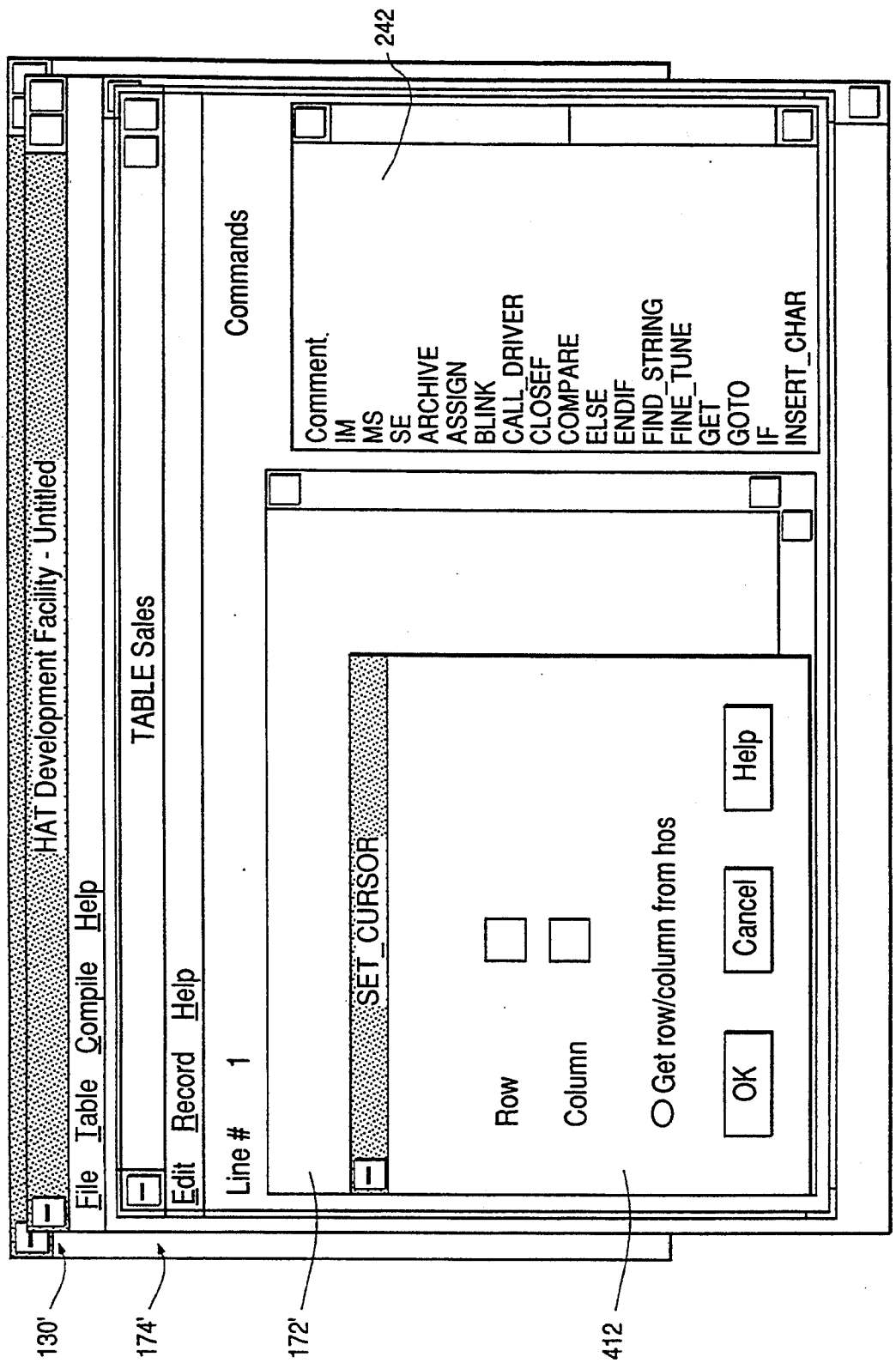
FIG. 20 illustrates the set cursor dialog box.

The system administrator next wishes to set the cursor on the host panel P5. He does this by selecting the SETCURSOR command from the command window 242 and this produces the setcursor dialog box 412 shown in FIG. 20. The system administrator will designate the location on the panel P5 where he desires the place the cursor, using his mouse pointing device.

The system administrator would also like to add a message string to the HAT edit window and this is done by selecting a MESSAGE command from the command window 242.

Figure 21:
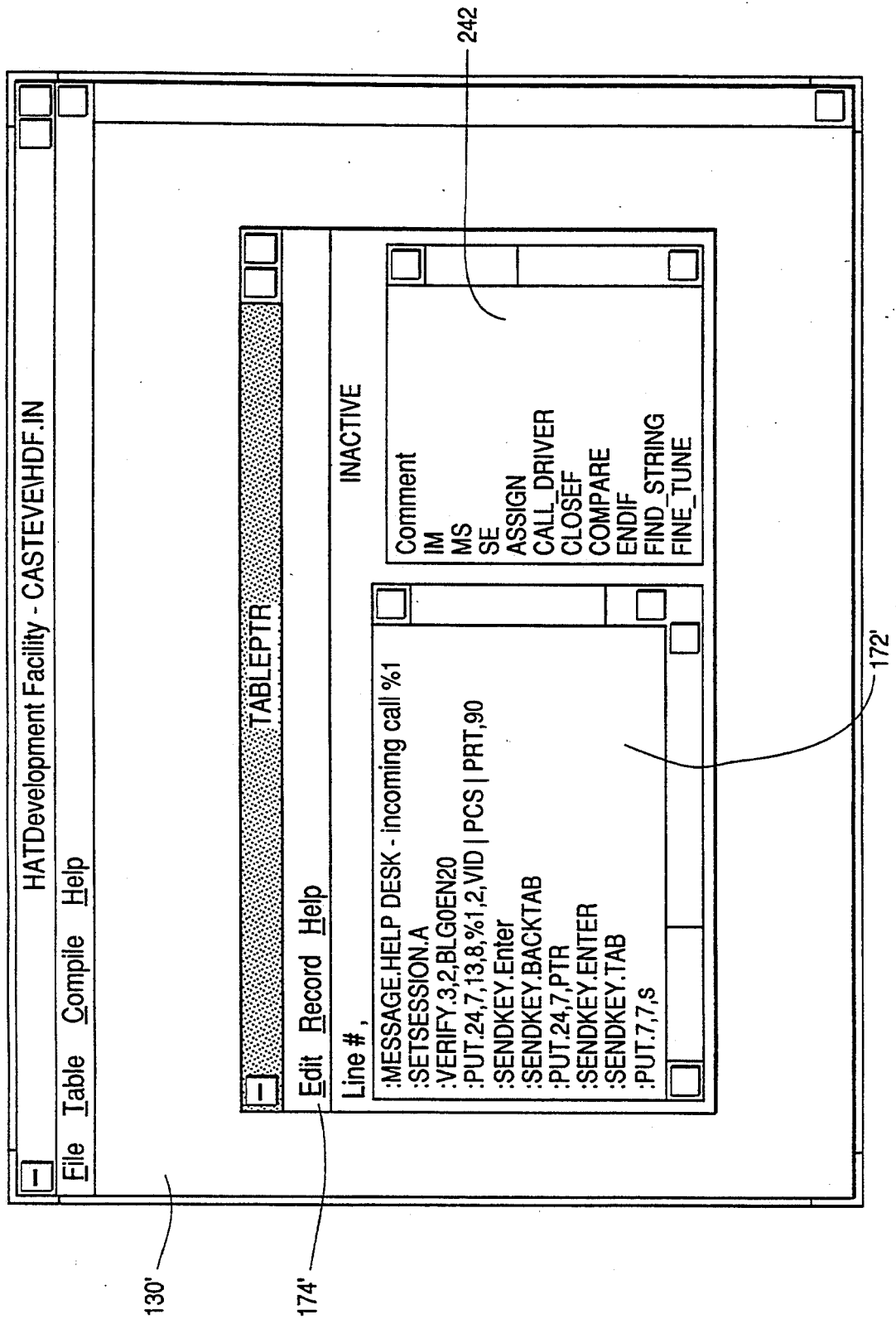
FIG. 21 illustrates a completed HAT command table in the call table window of the host development facility invention.

The completed HAT command table which resides in the HAT edit window 172' is shown in Table E8. The completed call table 174' which includes the completed HAT edit window 172' is shown in FIG. 21.

The resulting HAT Development Facility invention provides an intelligent editor for selecting HAT command tables, using online interaction with the host to automatically insert format information from the host display panels into HAT commands being created by the writer. The record mode of the HAT Development Facility invention allows the writer to work with the online host display panel and to tab through the fields on the panel. The writer can enter character strings at the keyboard and each time a cursor positioning or host action key is pressed, one or more HAT commands are automatically created and written into the HAT command table with the character strings having the required syntax. The HAT Development Facility invention displays command dialog boxes enabling the writer to select specific format and control features for individual HAT commands being created. The dialog box provides the option of allowing the writer to point to the intended fields with a mouse device, to obtain location coordinates or character strings which are automatically placed into the HAT command being created.

SECOND EMBODIMENT OF THE INVENTION

In a second embodiment of the invention, the HAT Development Facility runs in a multi-task mode with two other programs, the host interface program 138 as well as the terminal emulation program 128. The host interface program 138 can be run as an instruction interpreter, which interprets and executes the HAT commands in a HAT command table during normal workstation call center operations conducted by a telephone agent. In the second embodiment of the invention, the writer can select a real time test mode where he does not directly interact with the host. Instead, the host interface program 138 receives the newly created HAT commands as they are produced by the intelligent editor function of the HAT Development Facility 178. The newly created HAT commands are interpreted and executed by the host interface program 138, resulting in the performance of the intended function for the newly generated HAT command. The intended function usually requires forwarding to the terminal emulation program 128, some of the keystrokes entered at the keyboard and the keyboard buffer 136. When the host interface program 138 forwards simulated cursor position or host action keys, the terminal emulation program 128 will process those simulated keystrokes and exchange sequences of display panels with a host, just as if the workstation were in the normal workstation call center operational mode.

In the second embodiment of the invention, the HAT Development Facility 178 provides the capability for real time testing of the effectiveness of the HAT commands being created by the writer. A HAT command written into the HAT command table being constructed by the writer in the HAT edit window 172', contains only the literal representation of the variable names, which have no numerical names to the host 200. But when the host interface program 138 interprets and executes the HAT command received from the HAT Development Facility 178, it substitutes the numerical value represented by the literal representation of the variable name, and this has meaning to the application program running on the host 200. If a mistake has been made by a writer in the choice of data or a variable, for example, the resulting value sent by the terminal emulator program 128 to the host 200 will be recognized by the host application program in the host 200 as being erroneous. The next display panel sent back by the host 200 in response, will immediately tell the writer of his mistake. This second embodiment is referred to as the HAT construction and testing mode.

In order to accomplish the HAT construction and testing mode, the second embodiment of the invention includes some additional steps for the GENERATE SETSESSION command in FIG. 10, the GENERATE VERIFY command in FIG. 12, the GENERATE GET command in FIG. 15, the GENERATE PUT command in FIG. 17 and the GENERATE SENDKEY command in FIG. 19.

The GENERATE SETSESSION command in FIG. 10 adds steps 414, 416 and 418 following step 272. After the completion of step 272 where the SETSESSION.A command is written into the HAT edit window 172', the program passes over path 273' to step 414 which executes the session selector program 140 in the host interface program 138. This results in step 416 which sets the terminal emulation program 128 to the host A buffer 154. Then in step 418, the first panel from the first A buffer is displayed in the display buffer 130. Then the program flows to step 274 of FIG. 10 returning to the main program of the HAT Development Facility 178. Alternately, if host B were selected, then step 272' flows over step 273" to steps 414', 416' and 418' as shown in FIG. 10. In this manner, keystrokes sent from the keyboard 136 and presentation manager 125 go to the HAT Development Facility 178 which generates the HAT commands, the HAT commands in turn being sent to the host interface program 138 which executes the HAT command and sends corresponding key characters to the terminal emulation program 128. This requires three multi-task sessions for programs 178, 138 and 128.

The GENERATE VERIFY command of FIG. 12 adds step 420 in the second embodiment, which executes the VERIFY command in the host interface program over the path 297".

The GENERATE GET command of FIG. 15, in the second embodiment, adds steps 422 and 424, to execute the GET command in the host interface program and then set to the variable VAR equal to the characters at location R,C in the host panel over path 375'.

FIG. 17 for the GENERATE PUT command, adds for the second embodiment, steps 426, 428 and 430. The program flows from step 396 over path 397' to step 426 and determines if the string contains a variable and if it does, then the variable is set equal to the value of that variable which was obtained from a previous GET command. If the variable is a machine variable such as an ANI number from the PBX, then the writer is prompted to enter an example value for the variable. Then in step 428, the PUT command is executed in the host interface program 138. Then in step 430, the string is put into the host panel at the location R,C. Then the program goes to step 398 which returns to the main program.

In FIG. 19, the second embodiment of the GENERATE SENDKEY command adds steps 432, 434, 436, 438 and 440. From step 408 after the SENDKEY command is written into the HAT editing window, program flows over path 409' to step 432 where the SENDKEY command is executed in the host interface program 138. Then in step 434, the KEYNAME character is moved to the keyboard buffer 136 and a keyboard interrupt is issued. Then in step 436, a determination is made as to whether this is an action key. If it is an action key, then step 438 sends the host panel to the host 200. In response, the host 200 will return the next panel and in step 440 the response host panel is received from the host. Then the program flows to step 410 which returns to the main program. If, in step 436, the key name is not an action key, then the program flows directly to step 410.

In this manner, the second embodiment of the invention performs both HAT construction in the HAT edit window 172' and the real time testing of the newly constructed HAT commands.

FIG. 22 is a flow diagram illustrating the combined operation of the terminal emulation program 128, the HAT Development Facility program 178, and the host interface program 138, operating in multi-task mode.

In step 420 of FIG. 22, the terminal emulation program 128 is run in a first multi-task workstation session to exchange panels with the host 200. Then in step 452, the HAT Development Facility program 178 is run in a second multi-task workstation session.

In step 454 of FIG. 22, a trial HAT command table is built in the HAT assembly partition 172 using the HAT Development Facility program 178. Then in step 456, a PUT command can be included in the trial HAT command table being built, which will include a variable name such as a % 1, in the argument of the PUT command, representing a telephone data. Such telephone can include for example the ANI number, the DNIS number, or other machine-supplied data representing telephone information from the PBX 120.

Then in step 458 of FIG. 22, the trial HAT command table is loaded into the host access table partition 132 of the memory 104.

If the host interface program 138 is an interpreter program, then step 458 flows over path 459 to step 462. Alternately, if the host interface program 138 must be compiled with the trial HAT command table before execution, then step 458 flows over path 459' to step 460, to run the compiler 168 in a multi-task session in the workstation 100. Then step 460 flows to step 462.

In step 462 of FIG. 22, example telephone data is input into the buffer 126. The example telephone data can be an example ANI number, or an example DNIS number, or other appropriate examples of telephone data derived from the PBX 120.

In step 464 of FIG. 22, the host interface program 138 is run in a third multi-task workstation session. In step 466, the host interface program 138 executes a first HAT command from the trial HAT command table. In step 468, if the first HAT command is a PUT command with a variable name in the argument, then the variable is set equal to the telephone data. If the variable name is % 1, for example, then it is set equal to ANI data. Alternately, if the variable name is not a machine variable, but instead is a user-defined variable such as "#1," then that variable should have been previously defined by the writer using a GET command. The value of the variable is set equal to the corresponding value established by the previous GET command. If any errors have occurred in either defining variables with previous GET commands or alternately in inputting a machine data corresponding to machine variables, then step 470 will log any resulting error into the error log 166.

If there are more HAT commands in the trial HAT command table, then step 472 loops back to step 466 to get the next command and execute as previously described. Alternately, if step 472 determines if there are no more HAT commands in the trial HAT command table, then the program of FIG. 22 exits.

Step 454 of FIG. 22 builds the trial HAT command table using combinations of the record mode described above in FIG. 13 and the dialog mode also described above.

The writer can review the error log 166 and can also observe the suitability of the host panels returned from various exchanges carried out by the execution of the trial HAT command table, and can make suitable tests and changes to the trial HAT in order to accomplish his intended purpose. Thus it is seen that the invention provides the capability for real time testing of the effectiveness of the HAT commands being created by the writer in the trial HAT command table.

Although a specific embodiment of the invention has been disclosed, it will be understood by those having skill in the art that changes can be made to the specific embodiment without departing from the spirit and the scope of the invention.

What is claimed is:

1. In a system including a workstation coupled to a telephone network for receiving telephone data and coupled to a host computer running a panel driven host application program which exchanges panel images with the workstation, the panels containing fields for buffering operands to be processed by the host application program, the operands derived from the telephone data, a method for preparing a host access table (HAT) containing programmable HAT commands to control the workstation to function as a programmable interface between the host based application program and the telephone network to automatically transfer the operands from the telephone network to the host application program, comprising the steps of:

running a terminal emulation program in a memory in the workstation, in a first multi-tasking session, to exchange a first panel image with the host computer and to receive key stroke characters transferred from a keyboard buffer, that control operations of said terminal emulation program;

running a HAT Development Facility program in said workstation memory, in a second multi-tasking session, for monitoring said key stroke characters and generating trial HAT commands;

building a trial HAT in said workstation memory, using said HAT Development Facility program, said trial HAT containing said trial HAT commands;

running a host interface program in said workstation memory, for executing said trial HAT commands in said trial HAT, and in response thereto, automatically outputting simulated key stroke characters to said terminal emulation program to automatically repeat said operations of said terminal emulation program;

said terminal emulation program, in response to said simulated key stroke characters, exchanging said first panel image with the host computer and performing said operations;

whereby a host access table is constructed in the workstation.

2. The method of claim 1, which further comprises:
said building step further comprising:
including in said trial HAT a PUT command built by said HAT Development Facility program, said PUT command having an argument including a variable representing telephone data; and
said running said host interface program further comprising:
substituting said telephone data for said variable in said PUT command; and
inserting said telephone data into a predefined location in said first panel, in response to said PUT command.

3. The method of claim 2, which further comprises:
said receiving said response panel image further comprising:
said response panel including response data which is responsive to said telephone data in said first panel; and
detecting and logging errors in said response data.

4. The method of claim 1, which further comprises:
said building step further comprising:
including in said trial HAT a VERIFY command built by said HAT Development Facility program; and
said running said host interface program further comprising:
checking the identity of said first panel in response to said VERIFY command.

5. The method of claim 1, which further comprises:
said building step further comprising:
including in said trial HAT a SENDKEY command built by said HAT Development Facility program; and
said running said host interface program further comprising:
transmitting to the host computer at least a portion of said first panel in response to said SENDKEY command.

6. The method of claim 1, which further comprises:
said building step further comprising:
including in said trial HAT a GET command built by said HAT Development Facility program; and
said running said host interface program further comprising:

extracting data at a predefined location in said first panel and setting the extracted data equal to a predefined variable, in response to said GET command.

7. The method of claim 1, which further comprises:
said building step further comprising:
displaying a command menu of HAT commands which can be built by said HAT Development Facility program;
selecting a HAT command from said command menu;
displaying a dialog box for the selected HAT command, listing features which can be built by said HAT Development Facility program for said selected HAT command;
selecting a feature from said dialog box; and
building said selected HAT command with said selected feature, into said trial HAT in said workstation memory, using said HAT Development Facility program.

8. The method of claim 7, which further comprises:
said selected HAT command being a PUT command for inserting data into a predefined location in said first panel;
said step of selecting a feature, further comprising:
obtaining a location value for said predefined location by designating said predefined location on said first panel using a pointing device in the workstation.

9. The method of claim 7, which further comprises:
said selected HAT command being a VERIFY command for checking the identity of said first panel by verifying identity data one said first panel at a predefined location;
said step of selecting a feature, further comprising:
obtaining a location value for said predefined location by designating said predefined location on said first panel using a pointing device in the workstation.

10. The method of claim 7, which further comprises:
said selected HAT command being a GET command for extracting said data at a predefined location in said first panel;
said step of selecting a feature, further comprising:
obtaining a location value for said predefined location by designating said predefined location on said first panel using a pointing device in the workstation.

11. The method of claim 7, which further comprises:
said selected HAT command being a SENDKEY command for transferring a character from said host interface program to said terminal emulation program;
said step of selecting a feature, further comprising:
selecting either a position key character or an action key character.

12. In a system including a workstation coupled to a telephone network for receiving telephone data and coupled to a host computer running a panel driven host application program which exchanges panels images with the workstation, the panels containing fields for buffering operands to be processed by the host application program, the operands derived from the telephone data, a method for preparing a host access table (HAT) containing programmable HAT commands to control the workstation to function as a programmable interface between the host based application program and the telephone network to automatically transfer the operands from the telephone network to the host application program, comprising the steps of:

running a terminal emulation program in a memory in the workstation, in a first multi-tasking session, to exchange a first panel image with the host computer and to receive key stroke characters transferred from a keyboard buffer;

running a HAT Development Facility program in said workstation memory, in a second multi-tasking session, for monitoring said key stroke characters and generating HAT commands to automatically put characters into a field of said first panel image;

building a trial HAT in said workstation memory, using said HAT Development Facility program, said trial HAT containing a plurality of HAT commands to control the workstation;

running a host interface program in said workstation memory, for executing said plurality of HAT commands in said trial HAT, and in response thereto, automatically outputting simulated key stroke characters to said terminal emulation program;

said terminal emulation program, in response to said simulated key stroke characters, exchanging said first panel image with the host computer and receiving a response panel image from the host computer;

said building step further comprising:

said HAT Development Facility program having a record mode for monitoring said key stroke characters transferred from said keyboard buffer to said terminal emulation program and building new HAT commands to automatically put characters into a field of said first panel;

including said new HAT commands in said trial HAT in said workstation memory;

transferring a first positioning character from said keyboard buffer to said terminal emulation program which designates a position on said first panel to be a first position and said HAT Development Facility generating a first new HAT command to automatically control positioning on a panel image, which is included in said trial HAT;

transferring a first alphanumeric character string and a second positioning character from said keyboard buffer to said terminal emulation program and said HAT Development Facility in response thereto, generating a second new HAT command to automatically control placing said first alphanumeric string at said first position on said first panel image, said second new HAT command being included in said trial HAT.

13. The method of claim 12, which further comprises:
said first new HAT command being a SENDKEY.-TAB command and
said second new HAT command being a SEND-KEY.TAB command.

14. In a system including a workstation coupled to a telephone network for receiving telephone data and coupled to a host computer running a panel driven host application program which exchanges panel images with the workstation, the panels containing fields for buffering operands to be processed by the host application program, the operands derived from the telephone data, a data processing program which, when executed in said system, performs a method for preparing a host access table (HAT) containing programmable HAT commands to control the workstation to function as a programmable interface between the host based application program and the telephone network to automatically transfer the operands from the telephone network to the host application program, the method comprising the steps of:

the data processing program, when executed, performing the step of running a terminal emulation program in a memory in the workstation, in a first multi-tasking session, to exchange a first panel image with the host computer and to receive key stroke characters transferred from a keyboard buffer, that control operations of said terminal emulation program;

the data processing program, when executed, performing the step of running a HAT Development Facility program in said workstation memory, in a second multi-tasking session, for monitoring said key stroke characters and generating trial HAT commands;

the data processing program, when executed, performing the step of building a trial HAT in said workstation memory, using said HAT Development Facility program, said trial HAT containing said trial HAT commands;

the data processing program, when executed, performing the step of running a host interface program in said workstation memory, for executing said trial HAT commands in said trial HAT, and in response thereto, automatically outputting simulated key stroke characters to said terminal emulation program to automatically repeat said operations of said terminal emulation program;

said terminal emulation program, in response to said simulated key stroke characters, exchanging said first panel image with the host computer and performing said operations;

whereby a host access table is constructed in the workstation.

15. In a system including a workstation coupled to a telephone network for receiving telephone data and coupled to a host computer running a panel driven host application program which exchanges panel images with the workstation, the panels containing fields for buffering operands to be processed by the host application program, the operands derived from the telephone data, a data processing subsystem which builds a host access table (HAT) containing programmable HAT commands to control the workstation to function as a programmable interface between the host based application program and the telephone network to automatically transfer the operands from the telephone network to the host application program, the subsystem comprising:

the data processing subsystem running a terminal emulation program in a memory in the workstation, in a first multi-tasking session, to exchange a first panel image with the host computer and to receive key stroke characters transferred from a keyboard buffer, that control operations of said terminal emulation program;

the data processing subsystem running a HAT Development Facility program in said workstation memory, in a second multi-tasking session, for monitoring said key stroke characters and generating trial HAT commands;

the data processing subsystem building a trial HAT in said workstation memory, using said HAT Development Facility program, said trial HAT containing said trial HAT commands;

the data processing subsystem running a host interface program in said workstation memory, for executing said trial HAT commands in said trial HAT, and in response thereto, automatically outputting simulated key stroke characters to said terminal emulation program to automatically repeat said operations of said terminal emulation program;

said terminal emulation program, in response to said simulated key stroke characters, exchanging said first panel image with the host computer and performing said operations;

whereby a host access table is constructed in the workstation.

16. In a system including a workstation coupled to a telephone network for receiving caller identification data and coupled to a host computer running a panel driven host application program which exchanges panel images with the workstation, the panels containing fields for buffering operands to be processed by the host application program, the operands derived from the caller identification data, a subsystem for preparing a host access table (HAT) containing programmable HAT commands to control the workstation to function as a programmable interface between the host based application program and the telephone network to automatically transfer the operands from the telephone network to the host application program, the subsystem comprising:

a keyboard buffer in a memory in the workstation, for buffering key stroke characters input at the workstation;

a window partition in said workstation memory for buffering a communicated panel image transmitted from said host application program, said communicated panel having a first field at a first position thereon and a second field at a second position thereon in said window partition;

a terminal emulation program in said workstation memory, running in a first multi-tasking session and coupled to said keyboard buffer, for receiving key stroke characters transferred from said keyboard buffer, and inserting them into a field of said communicated panel image identified by a current position value;

a HAT Development Facility program stored in said workstation memory, running in a second multi-tasking session and coupled to said keyboard buffer, for monitoring said key stroke characters transferred to said terminal emulation program and generating HAT commands to automatically put characters into a field of said communicated panel;

a HAT assembly partition in said workstation memory, for buffering said HAT commands generated by said HAT Development Facility;

said keyboard buffer transferring a first positioning character to said terminal emulation program which updates said current position to be said first position and said HAT Development Facility generating a first HAT command to automatically control positioning on a first panel image, which is stored in said HAT assembly partition;

said keyboard buffer transferring a first alphanumeric character string and a second positioning character to said terminal emulation program and said HAT Development Facility in response thereto, generating a second HAT command to automatically control placing said first alphanumeric string at said first position on said first panel image, said second HAT command being stored in said HAT assembly partition;

whereby a host access table is constructed in said HAT assembly partition.

* * * * *